United States Patent
Geiger et al.

(10) Patent No.: US 11,036,309 B2
(45) Date of Patent: Jun. 15, 2021

(54) MICRO-OPTICAL ORIENTATION SENSOR AND RELATED METHODS

(71) Applicant: ams Sensors Singapore Pte. Ltd., Singapore (SG)

(72) Inventors: Jens Geiger, Thalwil (CH); Susanne Westenhöfer, Wettswil (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 565 days.

(21) Appl. No.: 14/908,690

(22) PCT Filed: Jul. 17, 2014

(86) PCT No.: PCT/SG2014/000337
§ 371 (c)(1),
(2) Date: Jan. 29, 2016

(87) PCT Pub. No.: WO2015/016772
PCT Pub. Date: Feb. 5, 2015

(65) Prior Publication Data
US 2016/0216777 A1    Jul. 28, 2016

Related U.S. Application Data

(60) Provisional application No. 61/860,341, filed on Jul. 31, 2013.

(51) Int. Cl.
*G01C 9/10* (2006.01)
*G06F 3/03* (2006.01)
(Continued)

(52) U.S. Cl.
CPC ............ *G06F 3/0312* (2013.01); *G01C 9/10* (2013.01); *G01D 5/34* (2013.01); *G06F 3/0325* (2013.01);
(Continued)

(58) Field of Classification Search
CPC .... G06F 3/0312; G06F 3/0325; G06F 3/0346; G01C 9/10; G01C 2009/066; G01C 2009/107; G01D 5/34; G01D 5/342
See application file for complete search history.

(56) References Cited

U.S. PATENT DOCUMENTS 5,847,820 A * 12/1998 Hamar .................... G01B 11/26
356/139.1
6,011,254 A *  1/2000 Sano ........................ G01C 9/06
200/61.45 R
(Continued)

FOREIGN PATENT DOCUMENTS

CN      102333401        1/2012
DE      19723069        10/1998
(Continued)

OTHER PUBLICATIONS

Australian Patent Office, International Search Report and Written Opinion, issued by ISA/AU in International Patent Application No. PCT/SG2014/000337 (dated Dec. 2, 2014).

*Primary Examiner* — Antonio Xavier
(74) *Attorney, Agent, or Firm* — Michael Best and Friedrich LLP

(57) ABSTRACT

The sensor (1) for determining an orientation of the sensor in a gravity field comprises a ball (2) and a rolling surface (R) describing a generally concave shape on which the ball can roll inside the sensor. A further surface (F) is arranged opposite said rolling surface, and a light emitter (E), a light detector (D) and another light emitter or detector is provided. A region (R) within which the ball (2) can move is limited by at least the rolling surface (R) and the further surface (F). And the light emitters (E) and detectors (D) are arranged outside the region (R) for emitting light through the rolling surface (R) into said region and detecting light exiting the region (3) through the rolling surface (R) or for
(Continued)

emitting light through the further surface (F) into said region (R) and detecting light exiting said region (R) through the further surface (F). Corresponding measuring methods and manufacturing methods are described, too.

19 Claims, 6 Drawing Sheets

(51) Int. Cl.
    *G01D 5/34*     (2006.01)
    *G06F 3/0346*     (2013.01)
    *G01C 9/06*     (2006.01)

(52) U.S. Cl.
    CPC ..... *G06F 3/0346* (2013.01); *G01C 2009/066* (2013.01); *G01C 2009/107* (2013.01); *G01D 5/342* (2013.01)

(56) References Cited

U.S. PATENT DOCUMENTS

| | | | | |
|---|---|---|---|---|
| 6,559,396 B1* | 5/2003 | Chou | ............... | H01H 35/02 |
| | | | | 200/61.45 R |
| 6,664,534 B2* | 12/2003 | Hjertman | ............... | G01C 9/10 |
| | | | | 250/216 |
| 2002/0135885 A1* | 9/2002 | Chen | ............... | G02B 13/06 |
| | | | | 359/662 |
| 2002/0144418 A1* | 10/2002 | Endo | ............... | G01R 33/0035 |
| | | | | 33/366.24 |
| 2003/0055597 A1* | 3/2003 | Berndorfer | ............ | G01C 9/10 |
| | | | | 702/150 |
| 2003/0168326 A1* | 9/2003 | Ogden | ............... | H01H 29/22 |
| | | | | 200/61.46 |
| 2004/0021099 A1* | 2/2004 | Figueria | ............... | G01C 9/02 |
| | | | | 250/559.37 |
| 2005/0132799 A1* | 6/2005 | Cooper | ............... | G01C 21/165 |
| | | | | 73/509 |
| 2006/0043555 A1* | 3/2006 | Liu | ............... | H01L 27/14618 |
| | | | | 257/680 |
| 2006/0157332 A1* | 7/2006 | Kelley, Jr. | ............ | H01H 35/02 |
| | | | | 200/61.45 R |
| 2010/0188654 A1 | 7/2010 | Horio | | |
| 2013/0033767 A1 | 2/2013 | Rudmann et al. | | |
| 2015/0340351 A1* | 11/2015 | Rossi | ............... | H01L 25/167 |
| | | | | 257/82 |

FOREIGN PATENT DOCUMENTS

| | | |
|---|---|---|
| JP | 2007212377 | 8/2007 |
| TW | 201102623 | 1/2011 |
| TW | 201310626 | 3/2013 |

* cited by examiner

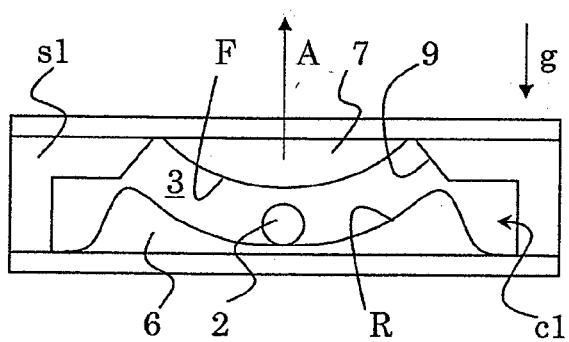 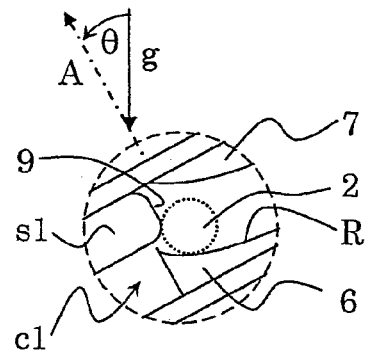
Fig. 8    Fig. 9
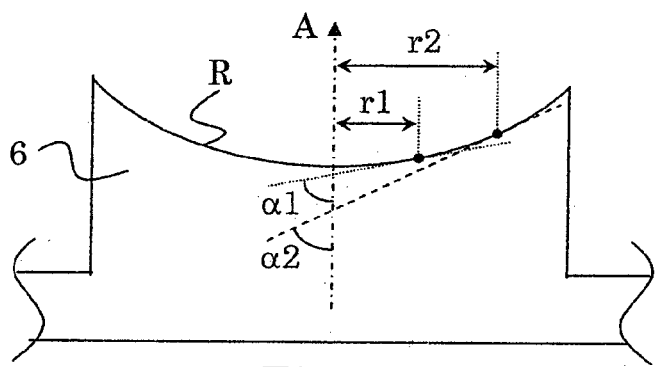
Fig. 10
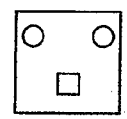
Fig. 13
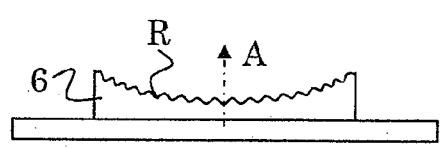 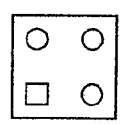 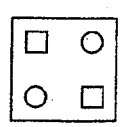
Fig. 11    Fig. 14    Fig. 15
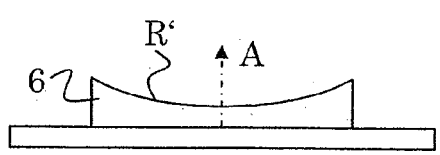 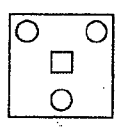 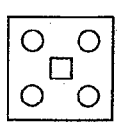
Fig. 12    Fig. 16    Fig. 17

MICRO-OPTICAL ORIENTATION SENSOR AND RELATED METHODS

FIELD

The invention relates to the field of orientation sensing and in particular to a sensor for sensing an orientation in a gravity field and related methods and devices. It relates to methods and apparatuses according to the opening clauses of the claims. Such devices find application, e.g., in photographic devices, in smart phones.

BACKGROUND

From US 2011/0128156 A1, a ball-rolling-type orientation sensor is known. That ball-rolling type orientation sensor includes a housing, a light emitter, two light receivers, and a rolling ball. The housing has a ring-shaped tunnel and a first opening connecting to the tunnel and two second openings respectively located on two sides of the first opening. The light emitter is arranged at the first opening and emitting light into the tunnel through the first opening. The light receivers are respectively arranged at the second openings and receiving light from the tunnel through the second openings. The rolling ball is arranged in the tunnel, whereby while the ball-rolling type orientation sensor is tilting, the rolling ball rolls toward the direction of gravity force, a portion of light emitted from the light emitter is reflected to one of the light receivers by the rolling ball, the light receivers respectively receive light with predetermined intensities and correspondingly output electric signals with predetermined strengths.

From JP 2009-229202 A, an inclination sensor is known in which a ball can be rolled in a space formed between a convex face and a concave face. An A-electrode and a B-electrode are oppositely disposed in regions on the convex face and the concave face in the detection direction of the inclination sensor. The inclination of the inclination sensor can be determined by sensing a change in an electrostatic capacitance generated between the electrodes due to an entrance and an exit of the ball 7 between the A-electrode and the B-electrode.

US20030168326 discloses a gravity-type sensor device comprising a switch which monitors the position of an object over a three dimensional pathway which extends dimensionally about all three orthogonal axes where the object may be tilted, rotated or inverted, as well as translated through space rather than maintained at a fixed location, so as to provide a signal to indicate that the object is moving in the correct three dimensional manner, whereby the switch is disposed within an external housing in a manner that allows the position of the switch to be altered relative to the housing, thereby allowing the angle or plane of the pathway to be adjusted when the housing is attached to different objects.

U.S. Pat. No. 6,011,254 discloses a photoelectric tilt-detecting sensor which, while simple in structure, is reduced of traveling-around of light transmitted therein to thereby improve the signal-to-noise ratio. The tilt-detecting sensor has a light-emitting element and a light-receiving element respectively fixed in an opposed relation in a main body, and slant surfaces provided between the light-emitting element and the light-receiving element to define a space in the main body. The slant surfaces has an elongate groove so that a spherical ball is allowed to stably move therealong. A lid integral with the main body enables bending thereof to enclose the space of the main body. These lid and the main body is formable in one body by using dies through simplified processes, realizing large-scaled production.

U.S. Pat. No. 5,847,820 discloses a laser apparatus for sensing rotational orientation or the degree of levelness. The apparatus includes a photosensitive cell and a diode laser directing a laser beam toward the photosensitive cell. Both the diode laser and the photosensitive cell may be mounted in a rigid housing. A ball lens is rotatably mounted between the diode laser and the photosensitive cell such that the laser beam must pass through the ball lens to impinge upon the position sensitive cell. The ball lens is subject to limited movement within the housing. The control for limiting movement of the ball lens may be a circular raceway or a negative lens. Movement of the ball lens within the circular raceway or on the negative lens causes the laser beam to shift on the target. The position of the laser beam on the target is a function of the position of the ball lens and can be correlated to either the rotational orientation of the housing or the degree of levelness of the housing.

US20020144418 discloses a sensor unit including a support body having a concave surface, a spherical body formed of a magnetic material and placed on the concave surface of the support body so as to roll freely thereon, a permanent magnet producing a magnetic field affecting the magnetic spherical body, and a magnetic sensor detecting a change in the magnetic field caused by the movement of said magnetic spherical body. The magnetic spherical body and the permanent magnet are provided to oppose each other with a given distance therebetween in a vertical direction. The magnetic sensor is provided between the magnetic spherical body and the permanent magnet. An output is produced in accordance with the detection by the magnetic sensor.

US20030055597 discloses a vehicle orientation sensor including a housing having a concave upper surface. Four contacts are disposed on the upper surface. The contacts are electrically isolated. A steel ball is placed in the center of the upper surface. When a vehicle in which the orientation sensor is installed is parked on an incline, the steel ball makes contact with two of the four contacts to close a circuit. A microprocessor connected to the orientation sensor can determine when the vehicle is parked on an incline by the closure of the circuit. Thus, an oil level measured while the vehicle is parked on an incline can be disregarded or compensated therefor.

US20060157332 discloses an omni-directional tilt and vibration sensor containing a first electrically conductive element, a second electrically conductive element, and an electrically insulative element. The electrically insulative element is connected to the first electrically conductive element and the second electrically conductive element, where at least a portion of the first electrically conductive element and at least a portion of the second electrically conductive element are located within the electrically insulative element. A plurality of electrically conductive weights are located within a cavity of the sensor, wherein the cavity is defined by at least one surface of the first electrically conductive element, at least one surface of the electrically insulative element, and at least one surface of the second electrically conductive element.

U.S. Pat. No. 6,559,396 discloses a tilt switch including an insulating housing with a bottom wall surface having an access opening, and an inner peripheral wall surface confining an accommodation chamber for receiving rollably an electrically conductive ball therein. Two electric contact terminals include two contact bodies with two rolling areas that are exposed from the access opening, and two terminal portions extending from the contact bodies and superimposed upon an upper mount surface of a support. The ball is rollable on the rolling areas between a switch-on maintaining position where the ball, though jerked by a slight tilting force, can maintain an electrical connection between the terminals, and a switch-off position where the ball is rolled out of contact with one of the rolling area by a big tilting force.

U.S. Pat. No. 6,664,534 discloses a tilt sensing device and method for its operation, the device being of the type comprising a) a housing, b) a radiation transmitter and a radiation receiver arranged in or at the housing to form a beam path therebetween, c) a radiation obstructing or deflecting body movable in relation to the beam path and d) a rest surface for the body defining at least two possible rest positions for the body relative the beam path between which rest positions the body can move by gravity at defined tilt angles for the device and which rest positions are selected to give a detectable output difference from the radiation receiver depending on which of the rest positions is occupied by the body. The size of the movable body, expressed as the diameter of a sphere of corresponding volume, is less than 10 mm. Operation of the device includes monitoring the output from the receiver to obtain an amplitude versus time function and processing data from the function to obtain a modified signal.

US20050132799A1 discloses a sensor system that is mounted on a host for recording motion of the host over time. The sensor system includes a sensor pad having a surface with a positive slope away from a center of the surface, and a mass resting on the sensor pad. The sensor pad includes an array of pressure sensors for determining the location of the mass on the sensor pad. The sensor system can further include a memory and a controller coupled to the memory and the sensor pad. The controller can determine the motion of the host from the location of the mass and record the motion in the memory.

Furthermore, MEMS-based accelerometers for orientation sensing in smart phones or tablet computers are known.

Definition of Terms

"Active optical component": A light sensing or a light emitting component. E.g., a photodiode, an image sensor, an LED, an OLED, a laser chip. An active optical component can be present as a bare die or in a package, i.e. as a packaged component.

"Passive optical component": An optical component redirecting light by refraction and/or diffraction and/or (internal and/or external) reflection such as a lens, a prism, a mirror, or an optical system, wherein an optical system is a collection of such optical components possibly also comprising mechanical elements such as aperture stops, image screens, holders.

"Replication": A technique by means of which a given structure or a negative thereof is reproduced. E.g., etching, embossing, imprinting, casting, molding.

"Wafer": A substantially disk- or plate-like shaped item, its extension in one direction (z-direction or stacking direction) is small with respect to its extension in the other two directions (x- and y-directions or lateral directions). Usually, on a (non-blank) wafer, a plurality of like structures or items are arranged or provided therein, typically on a rectangular grid. A wafer may have openings or holes, and a wafer may even be free of material in a predominant portion of its lateral area. A wafer may have any lateral shape, wherein round shapes and rectangular shapes are very common. Although in many contexts, a wafer is understood to be prevailingly made of a semiconductor material, in the present patent application, this is explicitly not a limitation. Accordingly, a wafer may prevailingly be made of, e.g., a semiconductor material, a polymer material, a composite material comprising metals and polymers or polymers and glass materials. In particular, hardenable materials such as thermally or UV-curable polymers are interesting wafer materials in conjunction with the presented invention.

"Lateral": cf. "Wafer"

"Light": Most generally electromagnetic radiation; more particularly electromagnetic radiation of the infrared, visible or ultraviolet portion of the electromagnetic spectrum.

SUMMARY

One object of the invention is to create an alternative, in particular an improved orientation sensor, more specifically a sensor for determining an orientation of the sensor in a gravity field. In addition, a device comprising the sensor, a manufacturing method for the sensor and a the respective method for determining an orientation of a sensor in a gravity field shall be provided as well as a use of the sensor.

Another object of the invention is to provide a sensor which allows to determine a polar angle indicating an orientation of the sensor. That polar angle may be defined, e.g., using a sensor axis of the sensor and the direction of gravity. Note that in the above-mentioned publication US 2011/0128156 A1, apparently no polar angles can be determined, but only azimuthal angles.

Another object of the invention is to provide a sensor which allows to determine an azimuthal angle indicating an orientation of the sensor. That azimuthal angle may be defined, e.g., using an azimuthal reference axis of the sensor, in particular an azimuthal reference axis of the sensor perpendicular to a sensor axis, and a projection of the direction of gravity into a plane perpendicular to the sensor axis.

Another object of the invention is to provide a sensor which allows to unambiguously determine an azimuthal angle in the range from 0° to 360°. Note that in the above-cited publication JP 2009-229202 A, apparently angles between 0° and 180° cannot be distinguished from angles between 180° and 360°.

Another object of the invention is to provide a sensor which allows to determine a polar angle and an azimuthal angle indicating an orientation of the sensor. Such a sensor can comprehensively determine the sensor's orientation in the gravity field.

Another object of the invention is to provide a well manufacturable orientation sensor.

Another object of the invention is to provide a way of manufacturing an orientation sensor on wafer level.

Another object of the invention is to provide a particularly miniscule orientation sensor.

Another object of the invention is to provide a particularly fast orientation sensor.

Another object of the invention is to provide a particularly precise orientation sensor.

Another object of the invention is to provide a particularly robust orientation sensor.

Further objects emerge from the description and embodiments below.

At least one of these objects is at least partially achieved by apparatuses and methods according to the patent claims.

The sensor for determining an orientation of the sensor in a gravity field comprises
a ball;

a rolling surface describing a generally concave shape on which said ball can roll inside the sensor;
a further surface arranged opposite said rolling surface;
a first active optical component which is a light emitter;
a second active optical components which is a light detector for detecting light emitted by said light emitter;
a third active optical component which is a light emitter or is a light detector;
wherein a region within which said ball can move inside the sensor is limited by at least said rolling surface and said further surface, and wherein, in a first configuration,
said active optical components are arranged outside said region for emitting light through said rolling surface into said region and detecting light exiting said region through said rolling surface, respectively;
or, in a second configuration,
said active optical components are arranged outside said region for emitting light through said further surface into said region and detecting light exiting said region through said further surface, respectively.

This way, a strong light intensity modulation of light emitted by at least one of the active optical components and detected by at least another one of the active optical components can be achievable. Said light intensity modulation is caused by and dependent on the movement of the ball. More particularly, light is emitted into said region in which the ball is present and in which the ball can move under the influence of gravity, and the light is, in this region, modulated by the presence of the ball, and the modulated light, after having left said region, can be detected, and from results of the detection, the position of the ball in said region and/or the orientation of the sensor can be inferred.

The light emitted by said light emitter may be, e.g., infrared light, but also light in other wavelength ranges may be used.

Because of gravity, the orientation of the sensor (in the gravity field) is linked to a position the ball has in said region, at least provided the ball is at rest, i.e. in a resting position. When the sensor has been moved, the ball will sooner or later (depending on the previous motion) find a resting position. Thus, after a while, i.e. when the orientation of the sensor has been unchanged for a while, the ball has taken a well-defined position related to the orientation of the sensor. Results of the detection depend on the position of the ball in said region and can thus be linked to the orientation of the sensor. It is possible and usually desirable to have a bijective relation between results of the detection and positions of the ball in said region.

The provision of three or more active optical components can allow to achieve a precise and unambiguous detection of the position of the ball on the rolling surface and/or of the orientation of the sensor from detected light intensities. Using four (or even more) active optical components can facilitate deriving orientation signals, i.e. signals indicative of said orientation, wherein signals may be analog or digital signals, wherein digital signals may also be considered (digital) data.

A predominant portion of said region within the ball can move inside the sensor is usually illuminated by at least said first active optical component, in particular by the light emitters of the sensor.

The mutual arrangement of said region, said rolling surface, said further surface and said active optical components and of the size and material of the ball may be chosen in such a way that intensity modulations detectable by the light detectors of the sensor are mainly due to shadowing effects or light blocking effects. In other words, it can be detected that (some of the) light emitted by at least said first active optical component which reaches at least said second active optical component (and can be detected there) in case the ball were not present inside said region, does not reach at least said second active optical component (and therefore cannot be detected there) when the ball is in a specific position inside said region. Some (partial) paths of light travelling from at least the first active optical component to the second active optical component are blocked by the presence of the ball inside said region, such that a decreased light intensity is detected by at least the second active optical component.

However, it is also possible to provide that the mutual arrangement of said region, said rolling surface, said further surface and said active optical components and of the size and material of the ball are chosen in such a way that intensity modulations detectable by the light detectors of the sensor are at least partially or even mainly due to reflection effects or light redirecting effects. In other words, light emitted by at least said first active optical component can reach at least said second active optical component and can be detected there which would not reach at least said second active optical component in case the ball were not present inside said region. Some (partial) paths of light travelling from at least the first active optical component to the second active optical component are created by the presence of the ball inside said region, such that an increased light intensity is detected by at least the second active optical component. E.g., said ball can be chosen to have a high reflectivity, and/or a reflective or metallic surface or interface can be provided which is present, in the first configuration, at said further surface or at a surface or interface present behind said further interface as viewed from the rolling surface and present, in the second configuration, at said rolling surface or at a surface or interface present behind said rolling interface as viewed from said further surface.

The sensor may have two cavities which are stacked upon each other (and in particular no more than two such cavities), with said region and the ball being located within the first cavity, said active optical components being located inside said second cavity. The cavities are optically coupled to each other.

Inside the first cavity, the ball is movably kept (within said region). And the movement of said ball is limited inside the first cavity by said rolling surface and said further surface—and possibly in addition by one or more additional surfaces which may be referred to as stop surfaces.

It can be provided that the further surface (or a shape generally described by the further surface) has the same symmetry as the rolling surface does (or as a shape generally described by the rolling surface has), e.g., rotational symmetry or elliptical symmetry.

The second cavity may be subdivided into separate compartments, in particular, one compartment for each of the active optical components of the sensor may be provided. The compartments may be (laterally) optically isolated with respect to each other in order to inhibit cross-talk. This may be accomplished by the provision of non-transparent walls within the second compartment. Between the first and second cavities, a substrate may be present. If present, that substrate (also referred to below as "second substrate") is at least partially transparent and may in particular comprise transparent and non-transparent portions. Thus, light can traverse this second substrate on its way from the emitting and to the detecting active optical components of the sensor.

Having both, light emitters and light detectors of the sensor, arranged on one and the same side of said region may contribute to an improved sensitivity of the sensor and/or to a capability of the sensor to distinguish a high number of different positions of the ball inside said region and thus a high number of different orientations of the sensor. Furthermore, this can contribute to making possible a particular miniscule overall size of the sensor.

The sensor can be realized in a micro-optical package, in particular in a micro-optical package which is manufacturable on wafer level.

The provision of a concave rolling surface may also contribute to a capability of the sensor to distinguish a high number of different positions of the ball inside said region and thus a high number of different orientations of the sensor.

The term "concave" can be understood as meaning "inwardly hollowed", whereas "convex" means "outwardly bulging".

The rolling surface may be bowl shaped, i.e. the rolling surface may describe a shape of an inner side of a bowl.

The wording "generally concave shape" indicates that the overall shape of the rolling surface is concave, or that an averaged shape described by the rolling surface is concave. Note that the rolling surface may be structured, e.g., furrowed or corrugated or provided with one or more protrusions and/or recesses. Thus, the rolling surface may be locally convex—but usually only on fractions of the rolling surface each extending over at most 10% and rather at most 4% of the area of the rolling surface.

The rolling surface usually has no more than exactly one boundary, more precisely no more than exactly one contiguous boundary (or boundary line) within the sensor, more precisely within said first cavity. A ring-shaped surface, on the contrary, would have two boundaries, an inner one and an outer one.

The sensor may be used for determining one or both of two magnitudes related to or indicative of an orientation of the sensor. Those two magnitudes are the polar angle (usually referred to as theta or θ) which can be considered the tilt of the sensor, and the azimuthal angle (usually referred to as phi or ϕ) which can be considered the tilt direction of the sensor.

Determining theta can allow to use the sensor as a level, e.g., as a substitute for a mechanic's level. Determining phi can allow to use the sensor for choosing an appropriate orientation of images or data displayed on a display or for determining an orientation of an image-taking device during image capturing, e.g., for appropriatelty tagging images taken, more particularly tagging corresponding image data.

It is noted here that the orientation sensor disclosed in the above-mentioned US 2011/0128156 A1 apparently is not capable of determining the polar angle (or tilt), but merely the tilt direction (azimutzhal angle ϕ) of the sensor. And furthermore, it is noted here that the inclination sensor disclosed in the above-mentioned JP 2009-229202 A apparently cannot distinguish azimuthal angles between 0° and 180° from azimuthal angles between 180° and 360°. Orientation sensors described in the present patent application, however, can be designed so as to allow to unambiguously determine the azimuthal angle, i.e. to distinguish phi over the full range of 360°.

Usually, the sensor's capability to determine the polar angle is limited to an angular range smaller than 90°, in particular smaller than 45°. Frequently, that angular range will be rotationally symmetric, i.e. identical for all azimuthal directions, but more generally, that angular range can be dependent on phi. This usually depends on the shape of the rolling surface (which again may depend on the shape of a possibly present stop surface). The determinable polar angles can be limited to an angular range of less than 30° or less than 25°, e.g., to 0° to 25° or 0° to 20° or less, in particular when said further surface describes a generally flat shape.

In one embodiment, the sensor has a sensor axis and a default orientation in which said sensor axis is oriented antiparallel to a direction of gravity. In the default orientation, a polar angle describing the tilt of the sensor (with respect to the direction of gravity) is 0°.

Note that said sensor axis has a direction, i.e. it is a vector, as is the direction of gravity. The gravity field defines the direction of gravity, which, on earth, points "downwards".

Having introduced the sensor axis, another description of a shape of the rolling surface can be provided which involves a body determining the shape of the rolling surface: When the shape of the rolling surface is determined by said body, it may be provided that all cross-sections through said body containing the sensor axis are generally concave.

In one embodiment referring to the last-mentioned embodiment, said rolling surface is shaped such that said ball can be in a default position on the rolling surface when the sensor has its default orientation, wherein, with the sensor having its default orientation and said ball being in said default position, potential energy of said ball increases with a movement of said ball on said rolling surface into any direction. With the rolling surface describing a bowl shape, the ball, in the default position, lies in what would be considered the deepest point of the bowl.

It can in particular be provided that said ball is, at least after some time for slowing down the ball, in said default position when the sensor has its default orientation. In other words, it can be provided that, when the ball is in a resting position and the sensor has its default orientation, the ball is in said default position.

In one embodiment referring to one or both of the two last-mentioned embodiments, it applies for the shape of the rolling surface that the further away from the sensor axis, the steeper is the rolling surface or at least an averaged surface of the rolling surface. In a more concrete and more mathematical way, one can say that an averaged shape of the rolling surface (in particular the rolling surface itself) is shaped such that within any cross-sectional plane through said averaged shape containing said sensor axis, an angle of at most 90° enclosed between a tangent in a tangent point of said averaged shape in said cross-sectional plane and the sensor axis decreases with increasing distance of the tangent point from the sensor axis. And in particular the rolling surface may be shaped such that within any cross-sectional plane through the rolling surface containing said sensor axis, an angle of at most 90° enclosed between a tangent in a tangent point of the rolling surface in said cross-sectional plane and the sensor axis decreases with increasing distance of the tangent point from the sensor axis. Roughly spoken, outwardly (i.e. away from the sensor axis), the rolling surface (or at least an averaged shape of the rolling surface) is increasingly steep.

This way, a determination of theta over an angular range for theta is facilitated. Suitable resting positions for the ball can be provided this way over an angular range of theta.

In one embodiment which may be combined with one or more of the before-mentioned embodiments, said rolling surface generally describes a portion of an ellipsoid. And more particularly, it may describe a portion of a sphere.

In one embodiment which may be combined with one or more of the before-mentioned embodiments, said rolling surface (or at least an averaged shape described by the rolling surface) describes a rotationally symmetric shape.

In one embodiment which may be combined with one or more of the before-mentioned embodiments, said rolling surface generally describes a shape described by the following formula:

$$z(r) = \frac{r^2}{R\left(1 + \sqrt{1 - (1+\kappa)\frac{r^2}{R^2}}\right)} + \alpha_1 r^2 + \alpha_2 r^4 + \alpha_3 r^6 + \ldots,$$

Therein, variable z denotes the position of the points defining the rolling surface with respect to the direction of the sensor axis, and variable r denotes, for rotationally symmetric cases, the radial distance from the sensor axis (measured perpendicular to the sensor axis), wherein in a more general case, r denotes a vector with two components such as components along two mutually perpendicular axes which are aligned perpendicular to the sensor axis, i.e. vector r then denotes a vector with an x and a y component with variables x, y and z belonging to a standard cartesian coordinate system (with x=y=z=0 describing the point where the sensor axis intersects with the rolling surface). R denotes a parameter related to the general size of the rolling surface and more particularly denotes a principal radius of curvature of the generally concave rolling surface, κ is a parameter related to a conic contribution to the shape of the rolling surface, and $\alpha_1$, $\alpha_2$, $\alpha_3$, ... are parameters for polymeric terms.

A suitable selection of the parameters κ and $\alpha_1$, $\alpha_2$, $\alpha_3$, ... makes possible to produce shapes as described above. However, many other potentially useful shapes may be established by selecting said parameters. A structuring of the rolling surface may be provided in addition.

Furthermore, suitably selecting the parameters κ and $\alpha_1$, $\alpha_2$, $\alpha_3$, ... in the above formula (or otherwise tailoring the shape of the rolling surface) can make possible to tailor the resolution of the sensor, more particularly to select or adjust the resolution in different regions of the rolling surface or in dependence of the distance to the sensor axis, and/or to influence the kinematics of the ball rolling on the rolling surface, i.e. to influence the speed at which the ball rolls in different regions on the rolling surface (under otherwise unchanged circumstances).

In one embodiment which may be combined with one or more of the before-mentioned embodiments, the rolling surface is structured and arranged such that within a (usually preset) range enclosed between the sensor axis and the direction of gravity (i.e. within an angular range of theta), the position of the ball is determined by the shape of the rolling surface. Of course, this applies provided that the ball is in a resting position.

In one embodiment which may be combined with one or more of the before-mentioned embodiments, a mean radius of curvature of rolling surface is at least 2.5 times the diameter of the ball and more particularly at least 3.5 times the diameter of the ball or even at least 4 times the diameter of the ball.

In one embodiment which may be combined with one or more of the before-mentioned embodiments, said further surface is substantially flat or describes a generally convex shape. However, it is also possible to provide that the further surface describes a generally concave shape.

In case the further surface describes a generally concave shape, the further surface can serve as an additional rolling surface. This may make possible to provide a sensor which is operable also when turned upside down. The further surface may describe the same shape as the rolling surface does (only arranged upside down), or it may describe a shape different from the shape described by the rolling surface. Having thus two rolling surfaces, namely a first and a second rolling surface, the sensor may be a sensor which an be understood to comprise corresponding first and second sensor axes (which usually are mutually antiparallel, i.e. parallel but oppositely directed) and possibly also corresponding first and second default orientations.

A sensor with a further surface representing an additional rolling surface may have two separate measuring ranges for polar angle theta.

Said ball usually is of spherical outer shape. And the ball is usually not transparent. The ball can be, e.g., a metal ball. A non-reflective coating may be present on the ball, so as to achieve a decreased reflectivity and/or an increased light absorption. A particularly high reflectivity of the ball is not required if detection is prevailingly based on shadowing by the ball or light absorption effects of the ball.

In one embodiment which may be combined with one or more of the before-mentioned embodiments, the sensor comprises a reflective or metallic surface or interface which is, in case of said first configuration
    present at said further surface or at a surface or interface present behind said further interface as viewed from the rolling surface;
or is, in case of said second configuration
    present at said rolling surface or at a surface or interface present behind said rolling interface as viewed from said further surface.

By means of said reflective or metallic surface or interface, a loss of intensity of light emitted by the at least one light emitter into said region can be decreased. Accordingly, more light may be available inside said region, such that detecting the position of the ball inside the region may thereby be facilitated.

There are at least two effects which may be alternatively or (rather) additionally achievable by providing said reflective or metallic surface or interface.

Firstly, said reflective or metallic surface or interface may be provided for reducing absorption of light emitted by the at least one light emitter into said region, in particular wherein said absorption comprises or is, in case of said first configuration, absorption outside said region at or beyond said further surface, or, in case of said second configuration, absorption outside said region at or beyond said rolling surface.

Thus, light paths of light emitted by the at least one light emitter into said region and otherwise leading to light-absorbing surfaces of the sensor can be blocked, and at least a portion of the otherwise lost light (lost light meaning light no more available in said region) can be returned into said region.

Secondly, said reflective or metallic surface or interface may be provided for reducing transmission of light emitted by the at least one light emitter into said region out of the sensor.

Thus, light paths of light emitted by the at least one light emitter into said region and otherwise leading out of the sensor can be blocked, and at least a portion of the otherwise lost light (lost light meaning light no more available in said region) can be returned into said region.

Said reflective or metallic surface or interface may be established by a reflective or metallic material. It may be established, e.g., by a metallic coating or a metallic layer.

Said reflective or metallic surface or interface may be a face of a metallic or reflective body. E.g., in case of said first configuration, said metallic or reflective body may be a body determining the shape of the further surface or even a body establishing said further surface, or, in case of said second configuration, said metallic or reflective body may be a body determining the shape of the rolling surface or even a body establishing said rolling surface. Note that designs are possible in which said further surface and said rolling surface, respectively, is established by a transparent material, and beyond that transparent material, a reflective or metallic material or coating or layer or body is present.

In one embodiment which may be combined with one or more of the before-mentioned embodiments, the sensor comprises a concave body comprised in or attached to a generally flat substrate, wherein the shape of said rolling surface is determined by said concave body. In particular, said rolling surface may be established by said concave body.

Details of substrates are discussed in more detail further below.

Said concave body may be different from the before-mentioned metallic or reflective body or may be, e.g., in the said second configuration, identical with the before-mentioned metallic or reflective body.

In case of said first configuration, said concave body is usually made of a transparent material.

The concave body may be manufactured, e.g., using replication, in particular using embossing. A multitude of concave bodies may this way be manufactured on wafer level.

Said concave body may in particular be a unitary body.

In one embodiment which may be combined with one or more of the before-mentioned embodiments, the sensor comprises at least two substrates, referred to as first substrate and third substrate, wherein said active optical components are mounted on said first substrate, and wherein said active optical elements, said ball and said region are located between said first and third substrates.

The provision of these substrates can facilitate manufacturing the sensor and/or facilitate to produce a hermetically sealed sensor.

In one embodiment referring to the last-mentioned embodiment, the sensor comprises, in addition, a substrate referred to as second substrate, said second substrate being arranged between said first and second substrates and being, at least in part, transparent.

Through said second substrate, light can be emitted from the at least one light emitter into said region. And, through said second substrate, light can propagate from said region to the at least one light detector. Thus, light can be emitted from the at least one light emitter through said second substrate into said region in which it can interact with said ball, such that the correspondingly altered or modulated light can propagate from said region through said second substrate to the at least one light detector in order to be detected there. The sensor can be designed in such a way that light emitted by a light emitter of the sensor is detectable in a light detector of the sensor only after having passed said second substrate at least twice.

The substrates we refer to may in particular have rectangularly arranged outer surfaces.

And substrates we refer to may have two opposing substantially flat faces.

And substrates we refer to may be substantially plate-shaped.

And substrates we refer to may have substantially identical lateral dimensions, in particular wherein the lateral dimensions of the sensor are substantially identical therewith. Manufacturability of the sensor may be greatly enhanced this way. Such lateral dimensions are typically below 15 mm, e.g., below 8 mm.

The term "lateral dimensions" refers to dimensions measured substantially perpendicular to the direction in which the substrates are subsequently arranged. The lateral dimensions may in particular be perpendicular to the sensor axis.

Typical overall heights of sensors (i.e. extensions in stacking direction, which usually corresponds to a direction along the sensor axis) are below 6 mm and more particularly below 4 mm.

Despite the above, it can be provided that one or more of the substrates is contiguous with another constituent of the sensor or constitutes a unitary part therewith, e.g., with a spacer (cf. below) or with a body, in particular with a body determining the shape of the rolling surface or a body determining the shape of the further surface.

In one embodiment referring to the last-mentioned embodiment, said second substrate comprises at least one non-transparent area and at least one transparent area. In particular, said second substrate may comprise at least one aperture, e.g., one aperture for each of the active optical elements.

A light propagation into and out of said region can locally be inhibited or blocked by the at least one non-transparent area. Thus, light exchange between said region and the space between said first and second substrates can be reduced to light passing through the at least one transparent area or through the at least one aperture. Suitably dimensioning the at least one transparent area or the at least one aperture allows to increase the sensitivity of the sensor or the reliability of the sensing results or orientation signals. It is possible to select or tailor lighting conditions in said region and/or detection conditions for one or more light detectors by suitably designing apertures, as will be explained below. In particular, this is a way of selecting the amount of light out of said region impinging on a light detector and/or of selecting the amount of light emitted by a light emitter reaching said region E.g., transparent portions or apertures assigned to light emitters may be larger (cover a larger area) than transparent portions or apertures assigned to light detectors. This may enhance the sensivity of the sensor. This is a way of selecting the amount of light emitted by a light emitter reaching said region.

It can in particular be provided that any one and more particularly each one of the transparent portions or apertures has an area of between 0.5 times and 2 times, in particular between 0.7 times and 1.5 times the area of $\pi d^2/4$, wherein d designates the diameter of the ball. This may enhance the sensivity of the sensor.

In addition thereto or alternatively thereto, it is possible to provide different (lateral) shapes for the transparent portions or apertures for at least two of the active optical components. Also this can enhance the sensitivity of the sensor or the reliability of the sensing results or orientation signals. In particular, this is a way of selecting, at least partially in dependence of its propagation direction and/or place of origin, the amount of light out of said region impinging on a light detector and/or of selecting, at least partially in dependence of its propagation direction and/or place of destination, the amount of light emitted by a light emitter reaching said region.

A non-transparent area may be produced, e.g., by applying a non-transparent coating. Or the second substrate may, in the non-transparent area, be made of a non-transparent material, in particular over its full thickness.

A transparent area may be established by the presence of a transparent material (fully or partially over the thickness of the second substrate) or by a hole, in particular a through-hole, in the second substrate.

However, it is also possible to provide that said second substrate is (fully) transparent (having no non-transparent region).

In one embodiment referring to one or both of the two last-mentioned embodiments, at least one lens or lens element is comprised in or attached to said second substrate.

This way, light may be guided in an optimized way, such that an increased sensitivity of the sensor may be achieved, e.g., via an improved signal strength obtainable at the light detectors.

Said lenses or lens elements may be refractive ones, diffractive ones, or combined diffractive and refractive ones. And they may be collecting ones or dispersing ones or collecting-and-dispersing ones. E.g., in light paths between the light emitters and said region, dispersing lenses or lens elements (e.g., concave lenses) may be provided, and in light paths between said region and the light detectors, collecting lenses or lens elements (e.g., convex lenses) may be provided.

One or more lenses may be provided on at least one face of the second substrate, in particular on that face of second substrate which faces the active optical components. And in particular in case of the second configuration, one or more lenses or lens elements may be provided, alternatively or in addition, on that face of the second substrate which faces the rolling surface.

Said lenses or lens elements may be manufactured using replication, in particular embossing.

More generally, any passive optical component may be provided instead of (or in addition to) said at least one lens or lens element.

In one embodiment which may be combined with one or more of the before-mentioned embodiments in which said first and third substrates are provided, the sensor comprises a first spacer, said first spacer being arranged between said first and third substrates, wherein said first spacer is optionally continuous with at least one substrate of the sensor, and wherein a distance parallel to the sensor axis between said rolling surface and said further surface is determined by said first spacer.

Said first spacer may be a part different from or a part continuous with said third substrate. And, said first spacer may be a part different from or a part continuous with said second substrate, if present.

Said first spacer usually is non-transparent, in particular made of a non-transparent material. This way, light exchange between the inside and the outside of the sensor can be reduced.

In one embodiment which may be combined with one or more of the before-mentioned embodiments in which said first substrate and said second substrate are provided, the sensor comprises, in addition, a spacer referred to as second spacer, said second spacer being arranged between said first and second substrates, wherein said second spacer is optionally continuous with said second substrate, and wherein a distance between said first and second substrates is determined by said first spacer.

Said second spacer may be a part different from or a part continuous with said second substrate.

Said second spacer usually is non-transparent, in particular made of a non-transparent material. This way, light exchange between the inside and the outside of the sensor can be reduced and/or cross-talk between light emitters and light detectors of the sensor can be reduced.

Said second spacer can be structured such that between said first and second substrates, separate compartments are created, in particular one for each of the active optical elements of the sensor, as has already been mentioned above. In particular if said second spacer is non-transparent, cross-talk between light emitters and light detectors of the sensor can be reduced.

Said second spacer may establish the one or more walls separating the compartments mentioned further above.

In one embodiment which may be combined with one or more of the before-mentioned embodiments, the surfaces limiting said region are shaped and mutually arranged in such a way that the ball cannot seize within said region. This can, more particularly, be provided by means of the following: For any position the ball can have inside said region in which the ball is in contact, at two or more contact points, with at least one (and typically at least two) of the surfaces defining said region, tangent planes to the respective one or more surfaces in these contact points do pairwise mutually intersect under formation of an angle of at least 90° or rather of more than 90°. The angle is, of course, measured in that section of space defined by the respective two tangent planes, in which the ball is present. A long-term safe and failure-free operation of the sensor can thereby be much facilitated.

In one embodiment which may be combined with one or more of the before-mentioned embodiments in which said first spacer is provided, said first spacer provides a surface referred to as stop surface, said stop surface contributing to limiting said region. Said stop surface is an inwardly pointing surface, more specifically a surface pointing towards the sensor axis.

Said stop surface may in particular be provided for avoiding said ball getting stuck between said rolling surface and said further surface. Said stop surface may furthermore in particular be established by a protrusion of the first spacer towards the sensor axis. Said protrusion may point towards or reach into a gap present between said rolling surface and said further surface (at an outer boundary of said surface).

The stop surface may act as a mechanical stop (inside the sensor, and limiting said region), by means of which it can be avoided that the ball reaches a position in which it might seize between the rolling surface and the further surface because of these surface being so close to each other that the ball, once in this position, would not leave this position merely due to its weight, i.e. in a position in which externally applied forces would be required for moving the ball out of this position again, e.g., by shaking the sensor, as far as moving the ball out of this position would be possible at all.

Said stop surface may in particular describe a generally elliptic shape such as a generally circular shape, e.g, a ring shape, a tubular or cylindrical shape.

In one embodiment which may be combined with one or more of the before-mentioned embodiments, the sensor comprises a fourth active optical component which is a light emitter or is a light detector. This can facilitate determining the position of the ball and/or the orientation of the sensor.

It is possible to provide one light emitter and three light detectors. In this case, three identically constructed light emitters may be used.

It is also possible to use one light detector and three light emitters. In this case, a time-multiplexing operation may be used, such that the light emitters emit light at different times, and the light detector is synchronized with the light emitters.

It is also possible to use two light detectors and two light emitters. In this case, a time-multiplexing operation may be used or a wavelength multiplexing, or a combination thereof.

Light emitters may be, e.g., light emitting diodes (LEDs) or organic light emitting diodes (OLED) or (semiconductor) lasers, and light detectors may be, e.g., photodiodes.

The active optical elements may be provided in the sensor in a packaged form, e.g., as a chip scale package or another surface mount device (SMD), or as a bare die, e.g., as a flip chip or a wire bonded chip.

Generally, it can be provided that the light emitters are operated to emit pulsed light, e.g., with a pulse rate between 5 Hz and 500 Hz, in particular between 20 Hz and 200 Hz. This saves energy and provides sufficient time resolution for many applications.

In one embodiment to be combined with the before-mentioned embodiment, the four active optical components are arranged on corners of a rectangle, in particular on corners of a square.

Such an arrangement is particularly space-saving, such that the overall size of the sensor can be particularly miniscule.

Such an arrangement requires less space than an arrangement with one active optical component in the middle and the other three arranged around this one. However, azimuthal symmetry is lost with respect to an arrangement with three active optical components on corners of an isosceles triangle and the fourth active optical component in the middle of the isosceles triangle.

In one embodiment to be combined with the before-last-mentioned embodiment, the four active optical components are arranged at least one of
- at positions not corresponding to the corners of a rectangle;
- at positions describing a pattern having no mirror symmetry;
- at such positions that no straight line on which (at least) two of them are arranged intersects the sensor axis;
- at such positions that no more than two of them are arranged on one and the same straight line.

Providing such arrangements of the active optical components can provide an improved precision of the sensor. On the one hand, it is possible that manufacturing tolerances have a smaller detrimental effect on the precision of the orientation sensed by the sensor when such "asymmetric" arrangements are selected. And on the other hand, less redundant and more useful information can this be obtained about the position of the ball, at least for certain positions of the ball.

In case that a fifth active optical component is provided, it can for the same reasons and with the same effect be provided that the five active optical components are arranged at least one of
- at positions describing a pattern having no mirror symmetry;
- at such positions that no straight line on which (at least) two of them are arranged intersects the sensor axis;
- at such positions that no more than two of them are arranged on one and the same straight line.

In one embodiment which may be combined with one or more of the before-mentioned embodiments, the sensor comprises an evaluation unit operationally connected to each light detector of the sensor for deriving orientation signals indicative of said orientation in dependence of signals outputted by the one or more light detectors of the sensor. In particular, said evaluation unit or a portion thereof is realized in one component, in particular in one integrated circuit, together with one of the active optical components. Even more particularly, said evaluation unit or a portion thereof may be realized in one component, in particular in one integrated circuit, together with a light detector of the sensor.

Said evaluation unit, however, may also be external to the sensor, e.g., comprised in a device comprising the sensor such as in a component such as a processor of that device.

Said orientation signals may be analog signals or, rather, digital signals.

Said deriving of orientation signals may include using a look-up table. The lookup-table may be provided for deriving orientation signals from detected intensities from the light detectors of the sensor.

In the look-up table, various constellations of detector signals may be linked to corresponding positions of the ball on the rolling surface and/or to corresponding orientations of the sensor.

Usually, the sensor has electrical contacts operationally connected to the active optical components of the sensor, in particular the electrical contacts are provided for controlling the one or more light emitters of the sensor (and possibly also for providing one or more of the light emitters with power) and for outputting data related to intensities detected by the one or more light detectors of the sensor, e.g., for outputting orientation signals.

In one embodiment which may be combined with one or more of the before-mentioned embodiments, said rolling surface is structured, more specifically, said rolling surface has furrows or corrugations, in particular wherein each of the furrows or corrugations encircles the sensor axis or extends radially from the sensor axis. Such a structuring may be provided for stabilizing the ball's position and/or slowing down the ball when in movement and/or effecting that the ball finds a resting position sooner and/or quantizing possible resting positions of the ball. E.g., at least 5 azimuthal and/or at least 8 radial furrows or corrugations may be provided in the rolling surface.

The structuring may be accomplished in such a way that two or more regions of stability are established, i.e. two or more regions in which the ball can be one of several stable positions, whereas between these regions, bordering regions are present in which the ball cannot assume a stable position. More particularly, each of said regions of stability provides a multitude of stable equilibria for the ball (and in particular no unstable equilibrium for the ball), whereas each of said bordering regions provides a multitude of unstable exilibria for the ball (and in particular no stable equilibrium for the ball). E.g., the rolling surface may exhibit two, three, four or even more of said regions of stability in which the rolling surface is concave, and these are, at least in part, separated from each other by protruding ridges (as said bordering regions) on which the ball usually cannot lie still.

Another way of accomplishing the structuring is to provide that the rolling surface has at least one local covexity or protrusion. In particular, exactly one local convexity or protrusion can be provided. One local convexity or protrusion may in particular be located in a central position of the rolling surface. More particularly, provided the sensor has the above-described sensor axis, this means that the local convexity or protrusion is located substantially where the sensor axis and the rolling surface intersect.

The local convexity or protrusion may, e.g., facilitate determining phi in case of little angles theta. With theta near 0°, e.g., theta smaller than 8° or smaller than 5°, it can be difficult to precisely determine phi. Said local convexity or protrusion can effect that the ball (when present on the rolling surface) cannot assume a position corresponding to said particularly small angles theta and thus that the ball can only assume positions in which theta is large enough for determining phi with a predetermined minimum precision. Thus, a (sufficiently precise) determination of phi can be ensured by means of the local convexity or protrusion.

The rolling surface can alternatively be free of one or both types of the furrows or corrugations or of other kinds of structuring.

Furrows or corrugations may, e.g., provide rounded steps in the rolling surface.

The terms "general shape" and "averaged shape of the rolling surface" may in particular refer to a shape obtainable when removing (e.g., by averaging out) furrows or corrugations possibly present on the rolling surface.

In one embodiment referring to the last-mentioned embodiment, said rolling surface comprises azimuthal furrows or corrugations each describing a closed loop, in particular a closed loop surrounding the sensor axis.

The device comprises at least one sensor described in the present patent application.

The device can be, e.g., a portable or mobile computing device.

The device can be, e.g., a smart phone.

The device can be, e.g., a tablet computer.

The device can be, e.g., a digital reader.

The device can be, e.g., a photographic device.

The device can be, e.g., a digital camera.

The device can be, e.g., a game controller.

The device can be, e.g., a device comprising a display and a control unit controlling said display, wherein said control unit is opertionally connected to said sensor for controlling said display in dependence of said orientation of said sensor.

The device can be, e.g., a tilt determining device for determining a tilt of an object relatively to which said sensor is fixedly positioned.

The device can be, e.g., an orientation determining device for determining an orientation of an object relatively to which said sensor is fixedly positioned.

The device can be, e.g., a control unit for controlling an actuator or at least a part of a machine or at least a part of an engine or at least a part of a drive.

The device can be, e.g., a machine comprising a controller for controlling at least a part of the machine in dependence of signals outputted by said sensor.

The device can be, e.g., an engine comprising a controller for controlling at least a part of the engine in dependence of signals outputted by said sensor.

The device can be, e.g., a drive comprising a controller for controlling at least a part of the drive in dependence of signals outputted by said sensor.

The sensor may in particular be fixedly attached at said device or to a part thereof and more particularly be fixedly attached inside said device.

Referring to said display, it may, for example, be provided that the way data are displayed by the display is (or can be) dependent on said orientation of said sensor; and/or it can be provided that what is displayed by the display is (or can be) dependent on said orientation of said sensor. E.g., in dependence of said orientation (or more specifically in dependence of orientation data provided by the sensor), data to be displayed such as text or images can be displayed in a landscape or in a portrait mode; or the display can display a level such as a mechanic's level illustrating said orientation or a corresponding orientation of said device.

In case the device has image-taking capability such in case of a camera (video and/or still-photographic), data concerning said orientation of said sensor during capturing an image may be stored in the device, e.g., in data descriptive of the captured image. This can facilitate presenting captured images in an appropriate orientation.

In one device embodiment, the device comprises a printed circuit board, wherein said sensor is mounted on said printed circuit board. In particular the device may comprise, in addition, at least one electronic component mounted on said printed circuit and operationally connected to said sensor via said printed circuit board. Said electronic component may be, e.g., said control unit or a portion thereof.

In one device embodiment which may be combined with the before-mentioned embodiment, the device comprises an evaluation unit operationally connected to said sensor for deriving orientation signals indicative of said orientation in dependence of signals outputted by said sensor. In particular, said evaluation unit may be operationally connected to each light detector of said sensor for deriving orientation signals indicative of said orientation in dependence of signals outputted by each light detector of the sensor. The evaluation unit may realize the same functions as the one described further above, e.g., it may comprise of be operationally connected to a look-up table.

The method for manufacturing a sensor for determining an orientation of the sensor in a gravity field comprises the steps of a) providing a ball;

b) providing a rolling surface describing a generally concave shape on which said ball can roll inside the sensor;

c) providing a further surface arranged opposite said rolling surface;

d) providing a set of at least three active optical components, said at least three active optical components comprising first active optical component which is a light emitter; at second active optical components which is a light detector for detecting light emitted by said light emitter; and a third active optical component which is a light emitter or is a light detector;

e) arranging said rolling surface and said further surface in such a way that a region within which said ball can move inside the sensor is limited by at least said rolling surface and said further surface; and f) arranging said active optical components outside said region such that they are, in a first configuration,
capable of emitting light through said rolling surface into said region and detecting light exiting said region through said rolling surface, respectively.
or, in a second configuration,
capable of emitting light through said further surface into said region and detecting light exiting said region through said further surface, respectively.

The method can in particular be a method for manufacturing a sensor as described elsewhere in the present patent application.

In one method embodiment, the method comprises the step of x) manufacturing a plurality of said sensors, each comprising a ball as described in step a), a rolling surface as described in step b), a further surface as described in step c), a set of active optical components as described in step
d), the arrangements being as described in steps e) and 0;
wherein step x) comprises providing a first substrate wafer,
a second substrate wafer and a third substrate wafer and a
first spacer wafer and a second spacer wafer, wherein
  said first spacer wafer is optionally continuous with said
    second substrate wafer;
  said first spacer wafer is optionally continuous with said
    third substrate wafer;
  said second spacer wafer is optionally continuous with
    said second substrate wafer;
  said second spacer wafer is optionally continuous with
    said first substrate wafer; and
wherein, with each sensor of said plurality of sensors in said
first configuration,
  on said first substrate wafer said plurality of said sets of
    at least three active optical components is present;
  said second substrate wafer comprises said plurality of
    said rolling surfaces, or a plurality of concave bodies is
    present on (and in particular is attached to) said second
    substrate wafer, each of said concave bodies determining the shape of a respective rolling surface;
  said third substrate wafer comprises said plurality of said
    further surfaces, or a plurality of further bodies is
    present on (and in particular is attached to) said third
    substrate wafer, each of said further bodies determining
    the shape of a respective further surface;
or, with each sensor of said plurality of sensors in said
second configuration,
  on said first substrate wafer said plurality of said sets of
    at least three active optical components is present;
  said third substrate wafer comprises said plurality of said
    rolling surfaces, or a plurality of concave bodies is
    present on (and in particular is attached to) said third
    substrate wafer, each of said concave bodies determining the shape of a respective rolling surface;
  said second substrate wafer comprises said plurality of
    said further surfaces, or a plurality of further bodies is
    present on (and in particular is attached to) said second
    substrate wafer, each of said further bodies determining
    the shape of a respective further surface.

Manufacturing sensors on wafer level can make the manufacture more efficient and may strongly reduce the manufacturing time for each single sensor.

The provision of further bodies can make possible to taylor said region, e.g., in order to prevent the ball from getting stuck, or in order to avoid damage to a surface limiting said region by limiting the dimensions of said region.

In one embodiment referring to the last-mentioned embodiment, the method comprises the step of
m) forming a wafer stack comprising, in the following order, the following wafers:
  said first substrate wafer,
  said second spacer wafer;
  said second substrate wafer;
  said first spacer wafer;
  said third substrate wafer.

Therein, it is possible to form one or more intermediate stacks comprising only a portion of said wafers and to interconnect these before one or more further wafers (or one or more intermediate stacks) are added.

Note that, as described above, one or both of the spacer wafers may be continuous with a respective adjacent substrate wafer.

In one embodiment referring to the last-mentioned embodiment, the method comprises carrying out for each of said plurality of rolling surfaces and for each of said multitude of balls, the step of
p) putting the respective ball onto a respective one of said plurality of rolling surfaces;
in particular wherein step p) is carried out, with each sensor of said plurality of sensors in said first configuration,
  when said first spacer wafer is connected to said second substrate wafer and before said third substrate wafer is connected to said first spacer wafer;
or, with each sensor of said plurality of sensors in said second configuration,
  when said first spacer wafer is connected to said third substrate wafer and before said second substrate wafer is connected to said first spacer wafer.

This way, handling the ball during manufacture of the sensor may be facilitated, and ensuring that the ball remains on the rolling surface after carrying out step p) may be facilitated, too.

Again, it is noted that, as described above, the first spacer wafer may be comprised in an adjacent substrate wafer, such as in the second substrate wafer (in said first configuration) or in the third substrate wafer (in said second configuration).

As is readily understood, step p) is carried out during step m).

In one embodiment which may be combined with one or more of the before-mentioned method embodiments comprising step x), the method comprises at least one of the following steps
r1) manufacturing each of said plurality of concave bodies using replication;
r2) manufacturing each of said plurality of further bodies using replication.

During step r1), at least one embossing step may be carried out, in particular wherein said at least one embossing step is carried out,
when each sensor of said plurality of sensors will be in said first configuration,
  on said second substrate wafer such that said concave bodies are thereby attached to said second substrate wafer; or
when each sensor of said plurality of sensors will be in said second configuration,
  on said third substrate wafer such that said concave bodies are thereby attached to said third substrate wafer; or
During step r2), at least one embossing step may be carried out, in particular wherein said at least one embossing step is carried out,
when each sensor of said plurality of sensors will be in said first configuration,
  on said third substrate wafer such that said further bodies are thereby attached to said third substrate wafer; or
when each sensor of said plurality of sensors will be in said second configuration,
  on said second substrate wafer such that said further bodies are thereby attached to said second substrate wafer.

This may allow to decrease the time required for the manufacture of a single sensor.

But it is also possible to use a replication method for manufacturing said concave and/or said further bodies and thereafter place these on the respective underlying substrate wafer.

And it is also possible to form, in a single replication process, the concave bodies and the respective underlying substrate wafer, e.g., using injection molding. And/or to form, in a single replication process, the further bodies and the respective underlying substrate wafer, e.g., using injection molding.

Also separate spacer wafers (first and/or second spacer wafers) may be manufactured using replication.

In one embodiment which may be combined with one or more of the before-mentioned method embodiments comprising step x), the method comprises providing, for each of said plurality of sensors, at least one lens or lens element at said second substrate wafer. Therein, said lenses or lens elements may in particular be replicated onto said second substrate wafer. The lenses or lens elements can contribute to improved light paths, leading to an improved sensitivity of the sensor. More generally, not only lenses or lens elements but (also other) passive optical components may be provided.

It is possible to provide that for each sensor, one lens or lens element is (or in case of said second configuration one or two are) provided per active optical component of the respective set of active optical components; or for one or more specific ones of the active optical components of the of the respective set of active optical components, one lens or lens element is (or two lenses or lens elements are) provided.

In one embodiment which may be combined with one or more of the before-mentioned method embodiments comprising step x), the method comprises the step of z) carrying out a separating step for obtaining singularized sensors.

For separating a wafer stack into singularized sensors, known methods such as laser cutting, sawing, dicing can be used.

The invention comprises sensors with features of corresponding manufacturing methods according to the invention, and, vice versa, also manufacturing methods with features of corresponding sensors according to the invention.

The method for determining an orientation of a sensor in a gravity field comprises
 providing a sensor described in the present patent application;
 determining said orientation by evaluating signals outputted by the light detectors of said sensor;
 producing signals referred to as orientation signals indicative of said orientation.

In one embodiment of this method, said orientation signals are indicative of a polar angle.

In one embodiment of this method which may be combined with the last-mentioned embodiment, said orientation signals are indicative of an azimuthal angle.

The invention comprises sensors with features of corresponding measuring methods according to the invention, and, vice versa, also measuring methods with features of corresponding sensors according to the invention.

The use is a use of a sensor described in the present patent application for determining an orientation in a gravity field of a device in or at which said sensor is fixed.

Further embodiments and advantages emerge from the dependent claims and the figures.

BRIEF DESCRIPTION OF THE DRAWINGS

FIG. 8 a schematized cross-sectional view of a portion of a sensor;
FIG. 9 a schematized cross-sectional view of a detail of a sensor;
FIG. 10 a schematized illustration of a rolling surface in a cross-sectional view;
FIG. 11 a schematized illustration of a structured rolling surface in a cross-sectional view;
FIG. 12 a schematized illustration of an averaged surface of the structured rolling surface of FIG. 11, in a cross-sectional view;
FIGS. 13 to 17 schematized illustrations of arrangements of active optical components on a substrate.

DETAILED DESCRIPTION

The described embodiments are meant as examples and shall not limit the invention.

Figure 1:
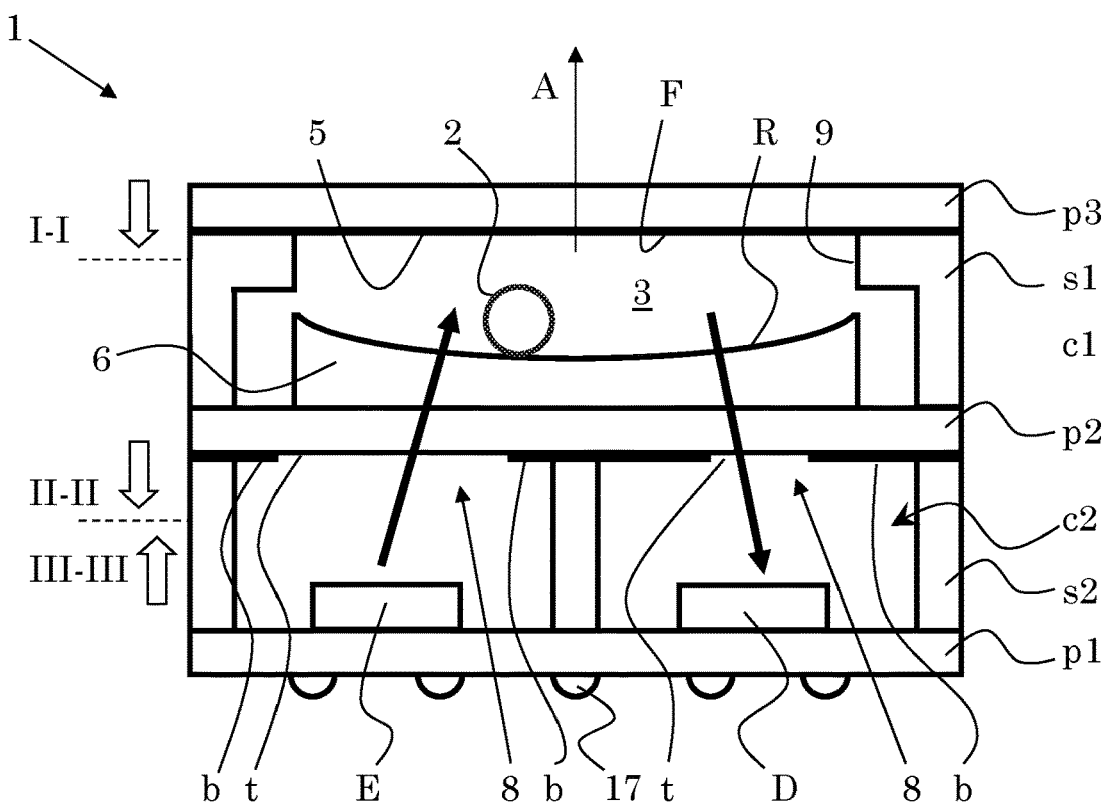
FIG. 1 a schematized cross-sectional view of a sensor in a first configuration.

FIG. 1 shows schematized cross-sectional view of a sensor 1 in a first configuration. Sensor 1 comprises a ball 2 present in a region 3 in which ball 2 is movably kept. The ball's mobility is limited by a rolling surface R on which ball 2 can roll and by a further surface F. In the illustrated embodiment, an optional stop surface 9 also contributes to limiting the ball's mobility. Region 3 and ball 2 are present in a first cavity c1 of the sensor 1.

In a second cavity c2, sensor 1 furthermore comprises three or more active optical components two of which are drawn in FIG. 1, namely a light emitter E and a light detector D. As symbolized by the thick arrows in FIG. 1, light emitter E is (or—if more than one is present—light emitters E are) arranged so as to emit light into region 3, and light detector D is (or—if more than one is present—light detectors D are) arranged so as to detect light having left region 3, the light originating at least one light emitter of sensor 1.

Sensor 1 furthermore comprises three substrates p1, p2, p3 and two spacers s1, s2. First cavity c1 is established by and/or enclosed by substrates p2, p3 and spacer s1. Second cavity c2 is established by and/or enclosed by substrates p2, p1 and spacer s2.

In the embodiment of FIG. 1, the shape of rolling surface R is determined by a concave body 6 present on substrate p2. The shape of rolling surface R may be, e.g., spherical or parabolic. In order to let light pass into region R and out of region R (cf. the thick arrows), body 6 is made of a transparent material such as a glass or rather a transparent epoxy or another transparent hardenable polymer material. The latter allow to manufacture body 6 using a replication technique.

In the embodiment of FIG. 1, the shape of further surface F is determined by substrate p3. On further surface F, a reflective or metallic surface 5 may be present in order to provide an improved reflectivity for light, thus strongly diminishing the amount of light exiting sensor 1 through substrate p3. Reflective or metallic surface 5 may be provided in the form of a coating, in particular a metallic coating. Further surface F may be identical with reflective or metallic surface 5, like illustrated in FIG. 1, or may be provided with another coating such as a transparent coating. Reflective or metallic surface 5 might, alternatively to what is illustrated in FIG. 1, be present at the outward face of substrate p3.

The shape of stop surface 9 is determined by spacer s1. The provision of stop surface 9 can make possible to avoid ball 2 getting stuck between rolling surface R and further surface F.

Sensor 1 has a sensor axis A which points in a direction away from rolling surface R and may be an axis of rotational symmetry of rolling surface R.

Substrates p1, p2, p3 are substantially plate-shaped, all having identical lateral outer dimensions describing one and the same rectangular, the term lateral relating to directions perpendicular to the direction of stacking of substrates p1, p2, p3, which again coincides with directions along sensor axis A.

Spacers s1, s2 provide that a distance (along the stacking direction) between neighboring substrates is fixed and well defined, namely amounting to the corresponding extension of the respective spacer, i.e. to the thickness of the respective spacer. Spacers s1, s2 may furthermore be non-transparent, so as to avoid light escaping through the respective spacer and light entering sensor 1 through the respective spacer, wherein it is also possible that only one of the spacers s1, s2 has this property. The non-transparency may be realized by manufacturing the respective spacer of a non-transparent material such as a non-transparent polymer, e.g., epoxy, or by applying a non-transparent coating to the respective spacer.

As described above, spacer s1 may in addition provide the function of a stop surface 9.

Spacer s2 may optionally, as illustrated in FIG. 1, be shaped so as to establish separate compartments (in cavity c2), e.g., one compartment for each active optical component of sensor 1. This can make possible to optically separate the active optical components, in particular when the portions of spacer s2 between neighboring compartments are non-transparent.

Furthermore, it is possible to provide that a spacer is continuous with an adjacent substrate. E.g., spacer s2 may be comprised in substrate p2.

Substrate p1 may substantially be a printed circuit board or an interposer on which the active optical components (such as D and E) of sensor 1 are mounted. On the outwardly facing face of substrate p1, substrate p1 provides electrical contacts 17 allowing to electrically contact the active optical components from outside sensor 1. Electrical contacts 17 may be, e.g., contact pads and/or, as illustrated in FIG. 1, solder balls.

The active optical components may be provided in the form of housed components, in particular surface mount devices (SMD) such as chip scale packages, or as flip chips or wire bound bare dies. Light emitters may be, e.g., LED or OLED or laser diodes; light detectors may be, e.g., photo diodes.

Substrate p2 may be made of a transparent material such as glass or a transparent epoxy or plexiglass or another polymer. In order to better define light paths between cavities c1, c2, substrate p2 may comprise a non-transparent area b (possibly more than one such area b) and at least one transparent area t, typically one transparent area t per active optical component. A non-transparent area may also be referred to as a blocking area since it blocks the propagation of light. The provision of areas b and t makes possible the formation of apertures 8. In the illustration of FIG. 1, the areas b, t are established by providing a structured non-transparent coating on substrate p2. Other ways of doing so will be described below.

The way of functioning of sensor 1 can be described as follows:

One or more light emitters E emit light into region 3, e.g., in a pulsed fashion, and one or more light detectors D detect a portion of that light after it has left region 3. Detection results depend on the location of ball 2 in region 3, wherein gravity force acts on ball 2. In normal measuring mode, ball 2 is present on rolling surface R. The position of ball 2 on rolling surface R is indicative of an amount of tilt of sensor axis A with respect to the direction of gravity and of a direction of that tilt. These magnitudes are usually expressed as polar angle theta and azimuthal angle phi.

Accordingly, the orientation of sensor 1 in a gravity field, e.g., described by theta and/or phi, can be determined from the detection results. At least three active optical components are required for this purpose, wherein the provision of four facilitates the determination of the desired sensor orientation. Certainly, also five active optical components or even more may be provided, but this however usually results in a larger overall size and possibly also in an increased power consumption of the sensor.

Figure 2:
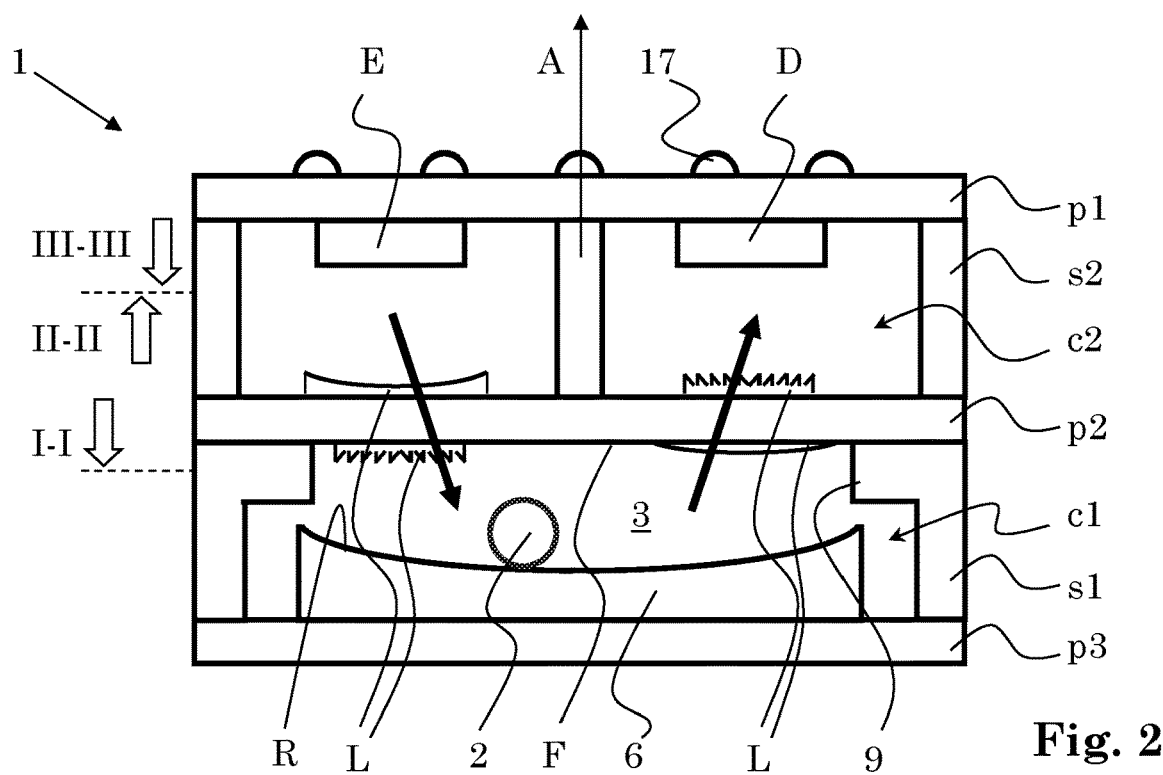
FIG. 2 a schematized cross-sectional view of a sensor in a second configuration.

FIG. 2 is a schematized cross-sectional view of a sensor 1 in a second configuration. The sensor 1 of FIG. 2 is in many aspects identical with or very similar to the sensor 1 of FIG. 1. Therefore, we shall describe mainly the differences between these sensors and configurations, respectively, and it may be referred to the description of the embodiment of FIG. 1 for the other details and functions. Optional features described in conjunction with FIG. 1 are optional in the second configuration (cf. FIG. 2), too, and vice versa, optional features described in conjunction with FIG. 2 may optionally be provided also in the first configuration (cf. FIG. 1)—each time, of course, only as far as still in agreement with the construction and functioning of the sensor.

Basically, in the second configuration (cf. FIG. 2), the arrangement of rolling surface R and further surface F is turned upside down. The orientation of sensor 1 in which sensor 1 is illustrated in FIG. 2 has been chosen such that sensor axis A points into the same direction as in FIG. 1, because this way, the illustrated orientation of sensor 1 in FIG. 2 is closer to a usual measurement orientation (ball 2 present on rolling surface R due to gravity).

Illumination of region 3 still takes place from cavity c2 to cavity c1 through substrate p2. But further surface F is established by or at substrate p2, and rolling surface R is established by or at substrate p3, in particular, as illustrated in FIG. 2, the shape of rolling surface R is determined by concave body 6 present on substrate p3.

Thus, transparent body 6 does not need to be (but still may be) transparent. A reflective or metallic surface or interface (similar to reflective or metallic surface 5 illustrated in FIG. 1) may be present either on the concave face of body 6 or at the interface between body 6 and substrate p3 (e.g., on the inwardly pointing face of substrate p3) or on the outwardly pointing face of substrate p3. In the latter two cases, concave body 6 should be transparent and in the latter case also substrate p3 should be transparent in order profit from the reflectivity of the reflective or metallic surface or interface.

In the second configuration, light is emitted through further surface F into region 3, and light having propagated from region 3 through further surface F is detected.

Substrate p2 may provide, besides one or more transparent regions, also one or more non-transparent regions and thus also apertures (not illustrated in FIG. 2).

In order to further improve the use of light in sensor 1, one or more lenses or lens elements L may be present on substrate p2. In both configurations, lenses or lens elements may readily be present in cavity c2. Lenses or lens elements in cavity c1, however, are difficult to provide in the first configuration because of the presence of rolling surface R which usually involves the presence of a concave body, and in the second configuration, attention must be paid that such lenses or lens elements are not damaged by ball 2.

Lenses or lens elements L may be provided for one or more of the active optical components of sensor 1. They may be, e.g., diffractive ones or refractive ones and may be collecting ones or dispersing ones, cf., e.g., FIG. 2.

Figure 3:
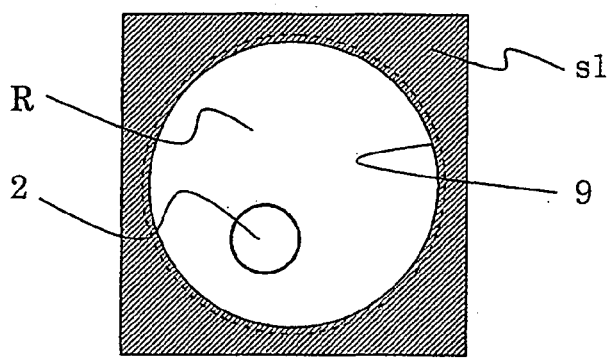
FIG. 3 a schematized cross-sectional view of a plane of a sensor similar to the sensors of FIGS. 1 and 2 indicated by I-I in FIGS. 1 and 2.
Figure 4:
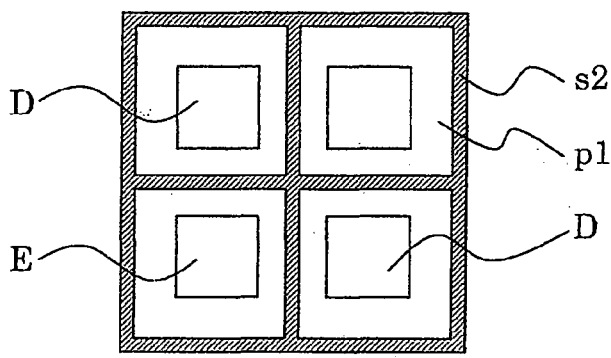
FIG. 4 a schematized cross-sectional view of a plane of a sensor similar to the sensors of FIGS. 1 and 2 indicated by II-II in FIGS. 1 and 2.
Figure 5:
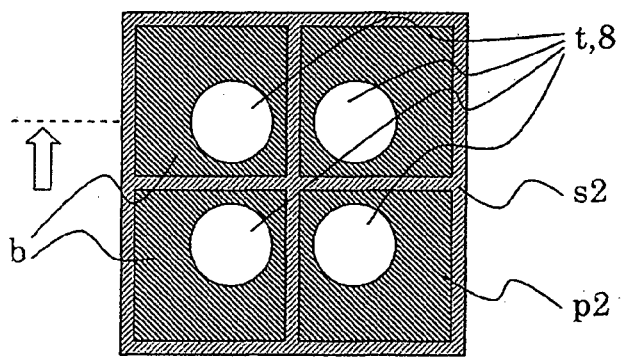
FIG. 5 a schematized cross-sectional view of a plane of a sensor similar to the sensors of FIGS. 1 and 2 indicated by in FIGS. 1 and 2.

FIGS. 3 to 5 show schematized cross-sectional views of planes of a sensor similar to the sensors of FIGS. 1 and 2. The planes and views are indicated in FIGS. 1 and 2 by I-I, II-II and respectively. Generally, it may be referred to the description of FIGS. 1 and 2 for details. Differences thereto will be explained.

FIG. 3 illustrates a detail of sensor 1 in cavity c1. In the illustrated case, the radial extension (radial extensions with respect to the sensor axis A which in FIGS. 3 to 5 is perpendicular to the drawing plane) of stop surface 9 is less than the outer boundary of concave body 6, the latter being symbolized by a dashed circle in FIG. 3. Spacer s1 is made of a non-transparent material.

FIG. 4 illustrates another detail of sensor 1 in cavity c1. In the illustrated case, four active optical components are provided, namely one light emitter E and three light detectors D. By means of spacer s2, four compartments are created in cavity c1, so as to optically isolate the active optical components from each other. Spacer s2 is made of a non-transparent material. And as may be provided also in the other embodiments, spacer s2 is continuous, more particularly is a unitary part.

FIG. 5 illustrates a detail of sensor 1 in cavity c2. Basically, substrate p2 is shown in FIG. 5. In the embodiment of FIG. 5, no lenses or lens elements are present on substrate p2, at least in cavity c2. But substrate p2 provides apertures 8, more particularly one aperture 8 for each active optical component. These are established by a non-transparent area b and four transparent areas t. The shapes and sizes of apertures 8 do not have to be equal, but may be.

Figure 6:
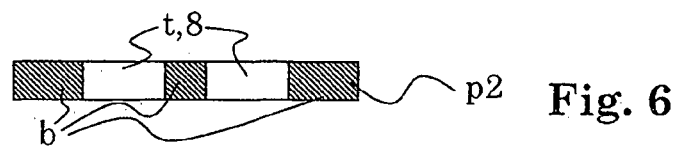
FIG. 6 a schematized cross-sectional view of a substrate of the sensor of FIGS. 3 to 5.

FIG. 6 is a schematized cross-sectional view of a substrate p2 of a sensor illustrated in FIGS. 3 to 5. The cross-sectional plane is indicated by the dashed line in FIG. 5. Portions of substrate p2 are made of a transparent material, and these portions are laterally surrounded by a portion of substrate p2 which is made of a non-transparent material. This is an alternative to the provision of non-transparent coatings as discussed in the description of FIG. 1. Accordingly, apertures 8 are provided by substrate p2.

Such a substrate p2 may be manufactured on wafer level. It may be obtained starting from plate(wafer) of non-transparent material, creating through-holes therein and filling the through-holes with a transparent material, e.g., a hardenable polymer. Alternatively, the through-holes are not filled. However, filling them makes possible to replicate lens elements or other passive optical components on substrate p2.

Figure 7:
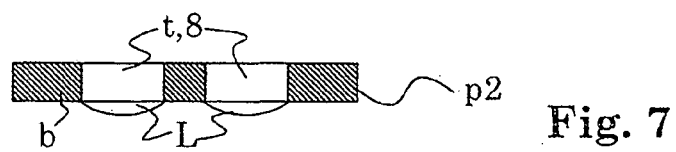
FIG. 7 a schematized cross-sectional view of a substrate of a sensor.

FIG. 7 is a schematized cross-sectional view of such a substrate p2. One or more lens elements L may be provided on substrate p2, on one or both sides of substrate p2, e.g., in the way illustrated in FIG. 2.

FIG. 8 is a schematized cross-sectional view of a portion of a sensor 1, namely of a portion comprising cavity c1. This portion of a sensor may be used as a part of a sensor in said first configuration such as one as described in conjunction with FIG. 1 or as a part of a sensor in said second configuration such as one as described in conjunction with FIG. 2. In the embodiment of FIG. 8, however, the shape of further surface F is not determined by the respective adjacent substrate (substrate p3 in case of said first configuration, p2 in case of said second configuration), but by a body 7 (also referred to as further body). Further body 7 may in particular describe a generally convex shape, e.g., like illustrated in FIG. 8. Further body 7 may, e.g., be a spherical segment. It may be replicated onto the adjacent substrate.

Furthermore, FIG. 8 illustrates that (concave) body 6 may have, in particular in a region surrounding the rolling surface R, a shape different from the shape illustrated in FIGS. 1, 2, e.g., like illustrated in FIG. 8. The same applies to stop surface 9.

FIG. 8 in addition serves to illustrate a default orientation of the sensor 1 and a default position of the ball 2. In the default orientation, sensor axis A is oriented antiparallel to direction of gravity g. The default position of ball 2 is the position ball 2 has when the sensor 1 has said default orientation—provided the ball is still. Gravity then forces ball 2 into that position in which it has its minimum potential energy on rolling surface R.

Figure 38:
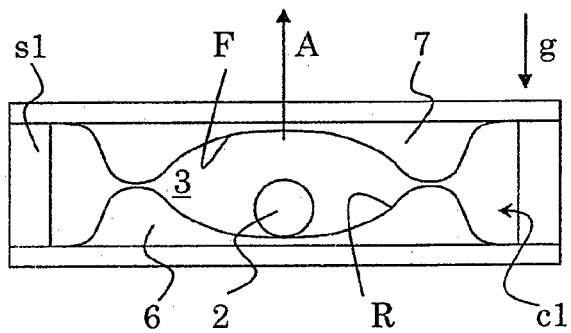
FIG. 38 a schematized cross-sectional view of a portion of a sensor.

FIG. 38 is a schematized cross-sectional view of a portion of a sensor 1, just like FIG. 8, but with a generally concave further surface F. Such a further surface may in fact be considered an additional rolling surface. Incorporating such a sensor portion in a sensor as illustrated in FIG. 1 or in FIG. 2 can result in a sensor which can also be used when oriented upside down. The reflective or metallic surface or interface may be present, e.g., as described for FIG. 2.

Although there is no stop surface present in the embodiment of FIG. 38, it is of course possible to provide one, in particular by designing spacer s1 accordingly.

Furthermore, the further surface F and the rolling surface R may be identically shaped (and oppositely arranged) as shown in FIG. 38, but it is also possible to provide a concave further surface F describing a shape differing from the shape of the rolling surface R.

FIG. 9 is a schematized cross-sectional view of a detail of a sensor 1, namely of a detail comprising cavity c1. FIG. 9 serves to illustrate yet another way of shaping spacer s1 so as to provide a useful stop surface 9. In addition, FIG. 9 illustrates the sensor having an orientation different from the default orientation. In this case, the sensor it tilted by an angle theta of about 30°. For angles greater than approximately this angle theta, polar angle theta cannot be determined anymore by means of the sensor. Distinguishing and determining polar angles by means of a sensor 1 is possible only between 0° and a threshold polar angle. The tilt direction (as indicated by azimuthal angle phi) can, however be distinguished and determined by means of the sensor also for higher polar angles.

The shapes rolling surface R may have can be various ones. Generally, it is a concave shape. It can be a bowl-shape. Elliptic, spherical and polymeric such as parabolic shapes are possible. The rolling surface may, in a general view, describe a portion of a cone or a frustrum of cone. And in a very general view, the rolling surface may generally describe even a concave surface, wherein portions of that concave surface are convex, e.g., similar to the horn of a trumpet or a tuba.

However, it can facilitate determining tilt angles theta when the rolling surface generally describes a shape providing the property that—within a theta measurement range—a resting position of the ball on the rolling surface is stabilized (with respect to movements of the ball towards smaller or larger theta) by the shape of the rolling surface. FIG. 10 is an attempt to describe a corresponding type of rolling surface shapes.

FIG. 10 is a schematized illustration of an embodiment of a rolling surface R for illustrating properties thereof. In addition, FIG. 10 illustrates the case that a body, more specifically a concave body 6, is continuous with the adjacent substrate (p2 in case of the first configuration and p3 in case of the second configuration).

In the embodiment of FIG. 10, the shape of rolling surface R has the property that with increasing distance from the sensor axis A, the steepness of the rolling surface increases, too. More specifically, taking any cross-section through the rolling surface comprising the sensor axis A and taking any two tangent points having different distances to axis A (r1, r2 in FIG. 10), the angle between the sensor axis (in this case neglecting its directivity, taking the angle which is smaller than 90°) and the tangent to the rolling surface in the respective tangent point ($\alpha 1$, $\alpha 2$ in FIG. 10) will be smaller for the tangent point having the larger distance to axis A. In a more mathematical expression: $r1 < r2 \Rightarrow \alpha 1 > \alpha 2$, cf. FIG. 10.

FIG. 11 is a schematized illustration of a structured rolling surface R. In this case, rolling surface R has azimuthal furrows. However, this rolling surface nevertheless describes a generally concave surface. The depth of the furrows is deliberately exaggerated in FIG. 11. Other kinds of structuring are possible, too, e.g., radial furrows (each extending into a different azimuthal direction), or a distribution of bumps over the rolling surface.

Figure 25:
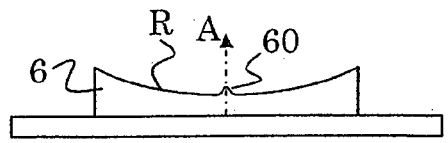
FIG. 25 a schematized illustration of a structured rolling surface in a cross-sectional view.

FIG. 25 is a schematized illustration of another structured rolling surface R. In this case, rolling surface R has a local convexity 60 which, more particularly, is located in a central position, where axis A intersects rolling surface R. However, this rolling surface nevertheless describes a generally concave surface. Convexity 60 can avoid that the ball assumes a position with polar angle theta=0° (and polar angles near 0°). This can facilitate determining azimuthal angle phi at small angles theta.

Figure 26:
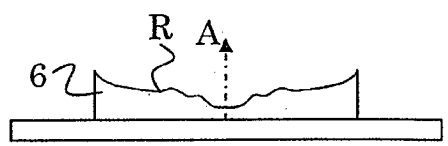
FIG. 26 a schematized illustration of a structured rolling surface in a cross-sectional view.

FIG. 26 is a schematized illustration of yet another structured rolling surface R. The structuring in this case is more complex than in the other illustrated kinds of structuring. However, this rolling surface nevertheless describes a generally concave surface.

It is furthermore noted that a rotational symmetry of a structuring of a rolling surface is not a necessity, but a possibility.

FIG. 12 is a schematized illustration of an averaged surface R' of the structured rolling surface R of FIG. 11 as well as of the structured rolling surface R of FIG. 25 and of the structured rolling surface R of FIG. 26, in the same cross-sectional view as FIGS. 11, 25 and 26.

FIGS. 13 to 17 and 27 to 35 are schematized illustrations of arrangements of active optical components on a substrate. The sensor axis is perpendicular to the drawing plane. A small circle symbolizes a light detector, a small square symbolizes a light emitter. The outer (lateral) shape of the substrate not necessarily has to describe the illustrated square.

In FIG. 13, an arrangement with three active optical components is illustrated. FIG. 14 illustrates the arrangement already described in FIG. 4. In FIG. 15, two light emitters and two light detectors are provided. Time multiplexing or wavelength multiplexing may be applied for operating the sensor. E.g., the two light emitters emit light pulses at different times, or they emit light of different wavelengths, each of the two light detector being designed for detecting light emitted from another one of the light emitters. In FIGS. 16, and 17 the light emitter is arranged approximately in the middle between the light detectors, wherein in FIG. 17, five active optical components are provided.

Figure 27:
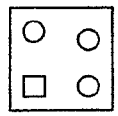
FIGS. 27 to 35 schematized illustrations of arrangements of active optical components on a substrate.
Figure 28:
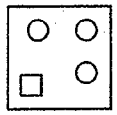
Figure 29:
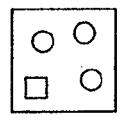
Figure 30:
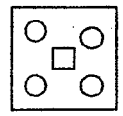
Figure 31:
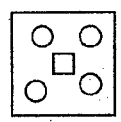
Figure 32:
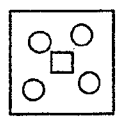
Figure 33:
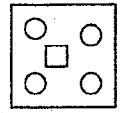
Figure 34:
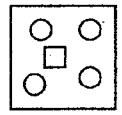
Figure 35:
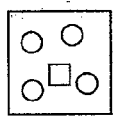

The arrangements of FIGS. 14 to 17 have a high degree of symmetry. It can be advantageous to arrange the active optical components in a less symmetric way. In FIGS. 27 to 29, four active optical components are provided which are not arranged on corners of a rectangle and which describe a pattern having no mirror symmetry. While in FIGS. 27 and 28 two active optical components lie on a straight line passing through the sensor axis (which is located in the middle of the outer rectangle), this is not the case for FIG. 29 in which the position of the sensor axis is indicated by a small dot.

In FIGS. 30 to 35, five active optical components are provided which are not arranged such that four would be located at corners of an rectangle and one in the middle of the rectangle and which describe a pattern having no mirror symmetry. While in FIGS. 30 and 31 three of the active optical components lie on one and the same straight line, this is not the case for FIGS. 32 to 35. And while in FIG. 32, two active optical components lie on a straight line passing through the sensor axis (which is located in the middle of the outer rectangle), this is not the case for FIGS. 33 to 35.

In the illustrated embodiments with less light emitters than light detectors, further embodiments emerge when interpreting a small circle as a light emitter and a small square as a light detector. In these cases, time multiplexing may be applied (the different light emitters) emitting light at different times), or wavelength multiplexing may be applied, e.g., the light emitters emitting light of different wavelengths and the light detector being capable of distinguishing these different wavelengths.

While the above (in particular cf. FIGS. 13 to 17 and 27 to 35) refers to the position of the active optical components, the same may apply for transparent portions or apertures, i.e. these may be positioned in the described ways and locations.

Figure 36:
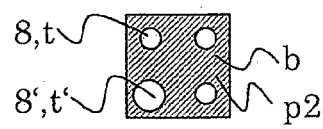
FIG. 36 schematized illustration of apertures in a substrate.

In addition, it can be provided that an aperture for one of the active optical components covers a greater or smaller (lateral) area than at least one other aperture. FIG. 36 illustrates an example. FIG. 36 is a schematized illustration of apertures in a substrate p2. Aperture 8' established by transparent portion t' covers a larger area than aperture 8 established by transparent portion t does.

Figure 37:
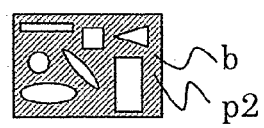
FIG. 37 schematized illustration of apertures in a substrate.

And furthermore, it can be provided that an aperture for one of the active optical components has a different (lateral) shape than at least one other aperture. FIG. 37 illustrates an example. FIG. 37 is a schematized illustration of apertures in a substrate p2. Various exemplary possible (lateral) shapes of apertures are illustrated such as circles, non-circular ellipses, squares, non-square rectangles, slits, triangles.

FIG. 37 is, in addition, an illustration of an example for a non-square outer (lateral) shape of the substrate. Further possible outer (lateral) substrate shapes are, e.g., circles, non-circular ellipses, triangles.

Non-rectangular shapes of substrates can be readily achieved, e.g., when applying laser cutting for separating sensors of a wafer stack.

Also for the boundary of the rolling surface, various shapes may be selected; e.g., circles, non-circular ellipses, squares, non-square rectangles, triangles.

Figure 18:
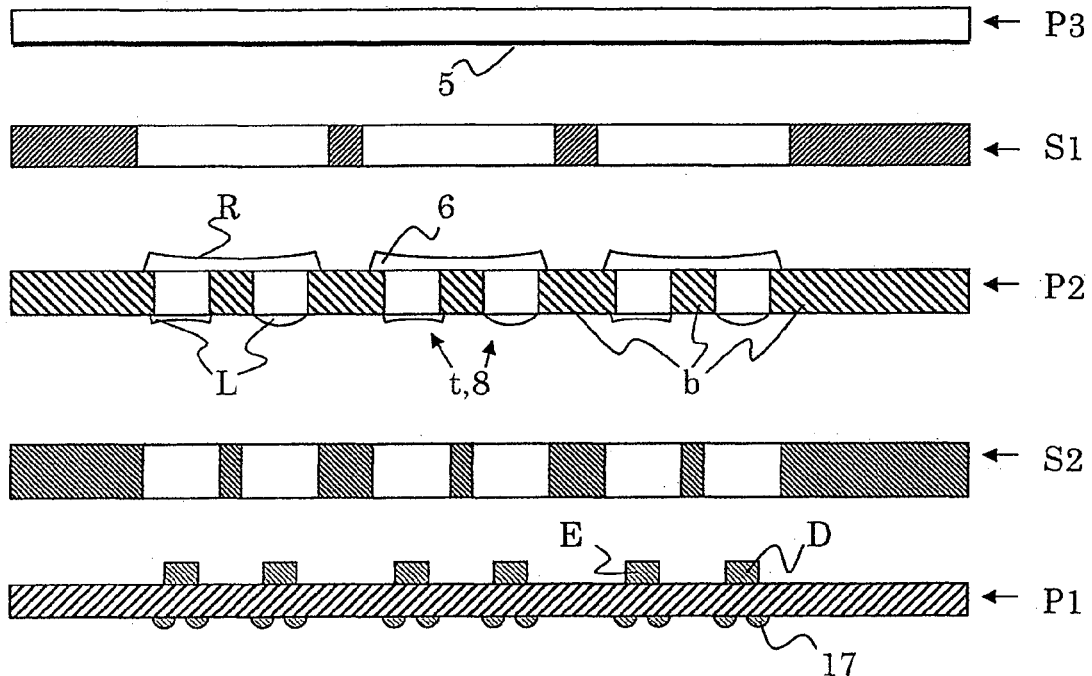
FIG. 18 a schematized cross-sectional view of wafers for forming a wafer stack for manufacturing a multitude of sensors.

FIG. 18 is a schematized cross-sectional view of wafers for forming a wafer stack for manufacturing a multitude of sensors 1 in the first configuration. Three substrate wafers P1, P2, P3 and two spacer wafers S1, S2 are provided. Hatched areas in FIGS. 18 and 19 indicate non-transparent material or active optical components.

Substrate wafer P1 is a printed circuit board with light emitters and light detectors mounted on it, as well as contact pads or solder balls 17 on the opposite side. Substrate wafer P2 is a generally non-transparent plate having transparent areas t establishing apertures 8. On one side, lens elements are attached to wafer P2, on the other side, concave bodies 6 establishing rolling surfaces R are attached to wafer P2. Substrate wafer P3 may be, as illustrated, generally transparent but provided with a metallization or reflective coating 5, wherein alternatively, it could be generally non-transparent.

Some details concerning properties and possible manufacturing methods of wafer P2 can be inferred from the description given above in conjunction with FIG. 6. Further details concerning properties and possible manufacturing methods of wafer P can be found in WO 2013/010285 A1. Therefore, WO 2013/010285 A1 is herewith incorporated by reference in the present patent application.

Figure 19:
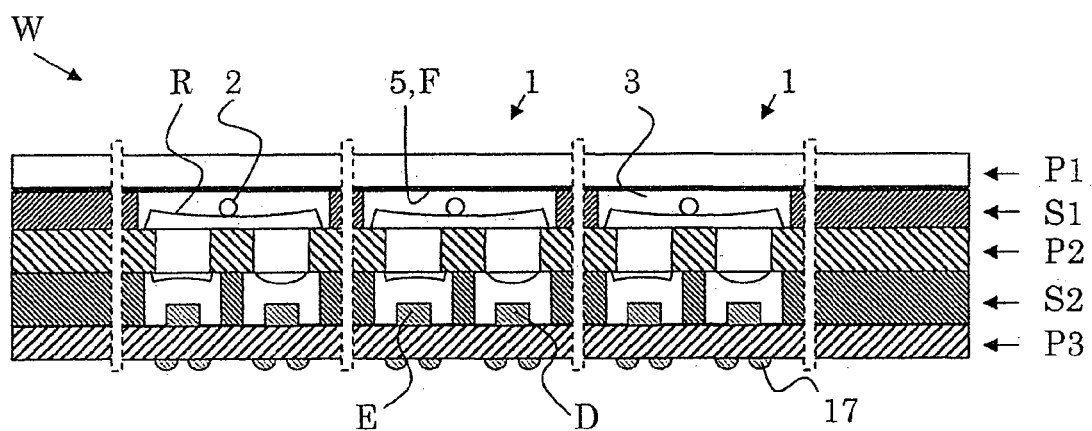
FIG. 19 a schematized cross-sectional view of a wafer stack for manufacturing a multitude of sensors.

FIG. 19 is a schematized cross-sectional view of a wafer stack W for manufacturing a multitude of sensors 1, based on the wafers illustrated in FIG. 18. Stack W may be formed in one or more fixation steps. At a time when spacer wafer S1 is adjacent to substrate wafer P2 (either already fixed thereto or not yet fixed), balls 2 are inserted into cavity 1, on rolling surface R, before substrate wafer P1 is attached to spacer wafer S1.

With the wafers aligned and fixed to each other, e.g., using epoxy glue or another bonding material, the wafer is diced, i.e. separated into singularized sensors 1, in the places indicated in FIG. 19 by the dashed thin rectangles.

It is clear from the present description how the wafers and the manufacturing method have to be adapted in analogy to the above in order to manufacture sensors in the second configuration. Furthermore, it is readily understood how the embodiment illustrated in FIGS. 18 and 19 has to be modified for manufacturing various variants of sensors, e.g., providing no or different lens elements, providing no apertures in wafer P2 and substrate p2, respectively, or realizing these by means of applying coatings, or providing a further surface F having a shape determined by a further (e.g., concave) body 7, and so on.

Figure 20:
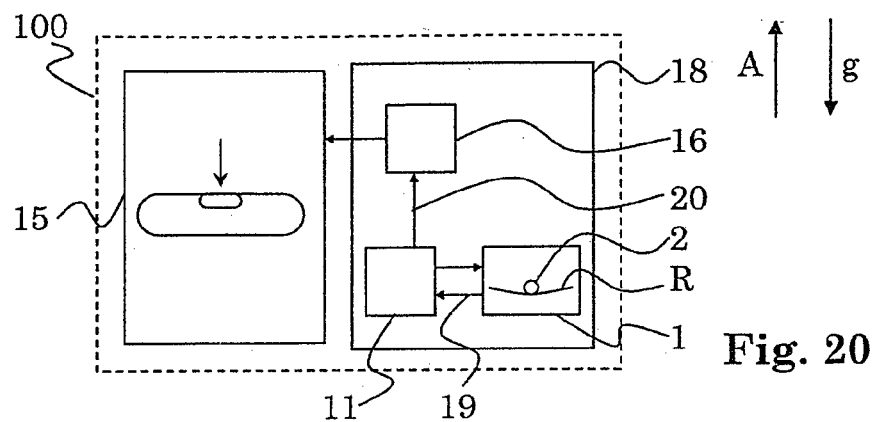
FIG. 20 a schematized illustration of a device comprising a display and a sensor.

FIG. 20 is a schematized illustration of a device 100 comprising a display 15 and a sensor 1. The device 100 has its default orientation in FIG. 20. The sensor may be any sensor described in the present patent application.

Figure 21:
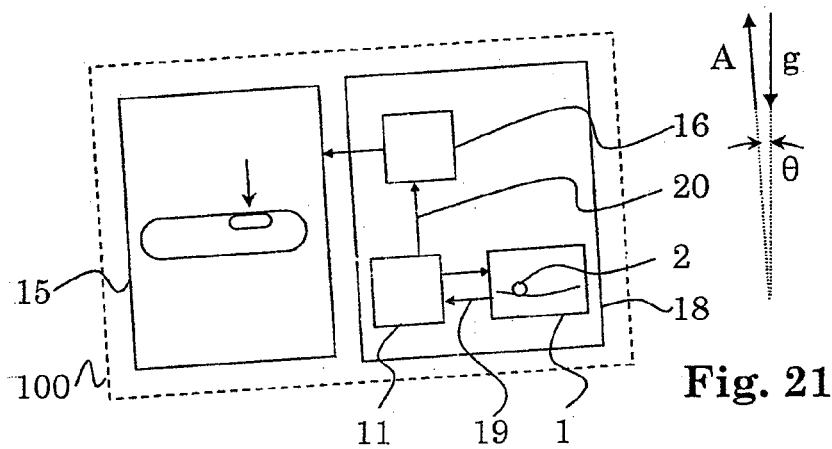
FIG. 21 a schematized illustration of the device of FIG. 20 in tilted orientation.

FIG. 21 is a schematized illustration of the device 100 of FIG. 20, but in tilted orientation. Polar angle theta is different from 0°.

Device 100 may be any device described in the present patent application, e.g., a smart phone or a mobile computing device, or an electronic replacement for a mechanic's level.

Display 15 is controlled by a control unit 16 which again is operationally connected to an evaluation unit 11. The latter two and sensor 1 are mounted on a printed circuit board 18, but might be mounted on different and mutually operationally interconnected printed circuit boards. Light intensity signals 19 from the one or more light detectors of sensor 1 are fed from sensor 1 to evaluation unit 11 for deriving orientation signals 20 therefrom. E.g., a lookup table may be used for deriving the orientation signals 20 from the detected light intensities. The orientation signals 20 are related to or rather indicative of the orientation of the sensor 1 and—provided sensor 1 is fixedly connected to further parts of device 100—of the device 100. In FIGS. 20 and 21, we shall confine to describing the tilt, i.e. the polar angle.

Evaluation unit 11 may be comprised in sensor 1 or not.

In FIG. 20, device 100 and sensor 1 have their default orientation as indicated by the position of ball 2 on rolling surface R. Sensor axis A is antiparallel to direction of gravity g.

In FIG. 21, device 100 and sensor 1 have a tilted orientation with a polar angle theta different from 0° as indicated by the position of ball 2 on rolling surface R. Sensor axis A is antiparallel to direction of gravity g.

The data displayed in display 15 depend on the orientation of sensor 1 and thus on the orientation of device 100 as determined using sensor 1 and evaluation unit 11, as illustrated in FIGS. 20, 21.

Figure 22:
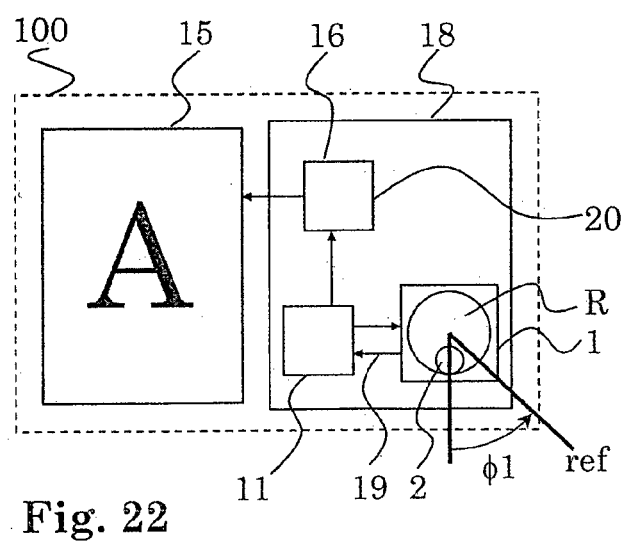
FIG. 22 a schematized illustration of a device comprising a display and a sensor.

FIG. 22 is a schematized illustration of a device 100 comprising a display 15 and a sensor 1. Device 100 of FIG. 22 can be identical to the one of FIGS. 20 and 21, but the relative orientation of sensor 1 and display 15 is different in FIG. 22, as is also symbolized in FIG. 22 by the symbol illustrating sensor 1. The sensor may be any sensor described in the present patent application. The sensor 1 can be identical to the one of FIGS. 20 and 21.

In FIG. 22, sensor 1 and device 100 are tilted along a tilt direction characterized by an azimuthal angle phi1—which is measured relative to a reference tilting direction indicated as "ref" in FIG. 22.

Figure 23:
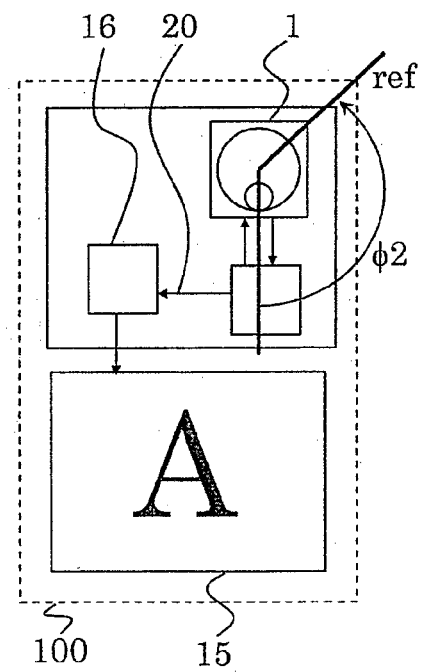
FIG. 23 a schematized illustration of the device of FIG. 22 in a different orientation.

FIG. 23 is a schematized illustration of the device 100 of FIG. 22, but in FIG. 23, device 100 is tilted along a different direction, namely along a tilt direction characterized by an azimuthal angle phi2 (also measured relative to the reference tilting direction indicated as "ref" in the Figs.).

In FIGS. 22 and 23, we shall confine to describing the tilt direction, i.e. the azimuthal angle. Polar angle theta is in both FIGS. 22 and 23 different from 0°.

The orientation of data displayed in display 15 depends on the orientation of sensor 1 and thus on the orientation of device 100 as determined using sensor 1 and evaluation unit 11.

Figure 24:
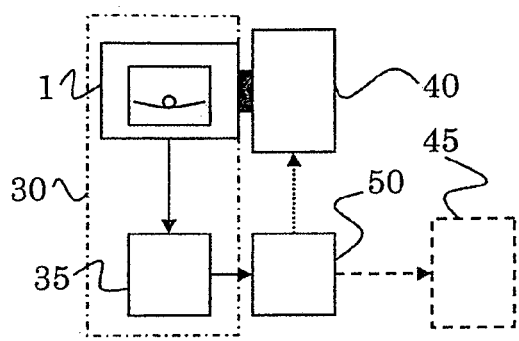
FIG. 24 a schematized illustration of a device comprising a sensor.

FIG. 24 is a schematized illustration of a device comprising a sensor 1. A controller 35 is provided which may establish, together with sensor 1, at least a part of a control unit 30. Controller 35 and control unit 30, respectively, can control an object 50 in dependence of signals provided by sensor 1. Sensor 1 is fixed with respect to an object 40, such that a tilt or an orientation sensed by sensor 1 is related to or corresponds to an orientation of object 40. Object 40 may be, e.g., a workpiece or a tool. Object 50 may be, e.g., an actuator. Object 50 may be, e.g., a machine, a drive or an engine, or a part of one of these. Object 50 may furthermore act on another object, referenced 45, under control of controller 35 and control unit 30, respectively. Object 45 may be, a workpiece or a tool or a machinery component.

In one interpretation of FIG. 24, the device is control unit 30.

In another interpretation of FIG. 24, the device comprises sensor 1, controller 35 and object 50, wherein the device may be, e.g., a machine, an engine or a drive, or a part of one of these. And the device may optionally comprise one or both of objects 40 and 45.

Sensors described in the present patent application allow to determine an inclination with respect to a vertical direction (direction of gravity force) and/or an azimuthal direction of the inclination axis with respect to an azimuthal reference axis of the sensor. The sensor can provide orientation signals or light intensity signals from which orientation signals can be obtained, wherein said orientation signals are related to or indicative of at least one angle (theta; phi) related to an inclination of the sensor (or of a reference axis of the sensor) with respect to a direction of gravity force.

The polar angle range within which polar angles can be distinguished is usually limited to polar angle range including 0°, and in particular to a polar angle range symmetric about 0°.

The sensors may generally be capable of unambiguously determining tilt orientations (azimuthal angles) within full 360°.

With (at least) three active optical elements, signals outputted by the at least one light detector can allow a determination of an orientation of the sensor, either directly or via determining the position of the ball on the rolling surface. The provision of four active optical components facilitates this.

Even though in Figures of the present patent application, region 3 and even the items present in cavity c1 show a rotational symmetry, this is, in a more general view, merely one possibility and may be designed differently.

The invention claimed is:

1. A sensor for determining an orientation of the sensor in a gravity field, the sensor comprising:
    a ball;
    a rolling surface describing a generally concave shape on which said ball can roll inside the sensor;
    a further surface arranged opposite said rolling surface;
    a first active optical component which is a light emitter;
    a second active optical component which is a light detector for detecting light emitted by said light emitter;
    a third active optical component which is a light emitter or is a light detector; wherein a region within which said ball can move inside the sensor is limited by at least said rolling surface and said further surface, and wherein
    said active optical components are on a first substrate and are arranged outside said region for emitting light through said rolling surface into said region and detecting light exiting said region through said rolling surface, respectively,
    a sensor axis, the first substrate being arranged to extend in a direction perpendicular to the sensor axis, and
    a shortest distance between the rolling surface and the first substrate differs for different points along the rolling surface, wherein the shortest distance between the rolling surface and the first substrate for the different points coincides with or is parallel to the sensor axis.

2. The sensor according to claim 1, the sensor having a default orientation in which said sensor axis is oriented antiparallel to a direction of gravity.

3. The sensor according to claim 2, wherein said rolling surface is shaped such that said ball can be in a default position on the rolling surface when the sensor is in its default orientation, wherein, with the sensor being in its default orientation and said ball being in said default position, potential energy of said ball increases with a movement of said ball on said rolling surface into any direction.

4. The sensor according to claim 2, wherein for the shape of the rolling surface applies that the further away from the sensor axis, the steeper is the rolling surface or at least an averaged surface of the rolling surface.

5. The sensor according to claim 1, wherein said rolling surface generally describes a portion of an ellipsoid.

6. The sensor according to claim 1, wherein the sensor comprises a reflective or metallic surface or interface which is present at said further surface or at a surface or interface present behind said further interface as viewed from the rolling surface.

7. The sensor according to claim 1, comprising a concave body comprised in or attached to a generally flat substrate, wherein the shape of said rolling surface is determined by said concave body.

8. The sensor according to claim 1, comprising second and third substrates, wherein said active optical elements, said ball and said region are located between said first and third substrates, and said second substrate is arranged between said first and third substrates and being, at least in part, transparent.

9. The sensor according to claim 8, said second substrate comprising at least one non-transparent area and at least one transparent area.

10. The sensor according to claim 8, wherein at least one lens or lens element is comprised in or attached to said second substrate.

11. The sensor according to claim 8, comprising a first spacer, said first spacer being arranged between said first and third substrates, wherein said first spacer is continuous with at least one substrate of the sensor, and wherein a distance parallel to the sensor axis between said rolling surface and said further surface is determined by said first spacer.

12. The sensor according to claim 11, further comprising a second spacer being arranged between said first and second substrates;
    wherein said second spacer is continuous with said second spacer, and wherein a distance between said first and second substrates is determined by said first spacer.

13. The sensor according to claim 11, wherein said first spacer provides a stop surface, said stop surface contributing to limiting said region.

14. The sensor according to claim 1, comprising a fourth active optical component which is a light emitter or is a light detector.

15. The sensor according to claim 1, wherein said rolling surface has furrows or corrugations.

16. A device comprising at least one sensor according to claim 1, wherein the device is at least one of
- a portable or portable mobile device;
- a smart phone;
- a tablet computer;
- a digital reader;
- a photographic device;
- a digital camera;
- a game controller;
- a device comprising a display, wherein the device is operationally connected to said sensor for controlling said display in dependence of said orientation of said sensor;
- a tilt determining device for determining a tilt of an object relatively to which said sensor is fixedly positioned;
- an orientation determining device for determining an orientation of an object relatively to which said sensor is fixedly positioned;
- a controller for controlling an actuator or at least a part of a machine or at least a part of an engine or at least a part of a drive;
- a machine comprising a controller for controlling at least a part of the machine in dependence of signals outputted by said sensor;
- an engine comprising a controller for controlling at least a part of the engine in dependence of signals outputted by said sensor;
- a drive comprising a controller for controlling at least a part of the drive in dependence of signals outputted by said sensor.

17. The device according to claim 16, wherein the device comprises a printed circuit board, wherein said sensor is mounted on said printed circuit board.

18. A sensor for determining an orientation of the sensor in a gravity field, the sensor comprising:
- a ball;
- a rolling surface describing a generally concave shape on which said ball can roll inside the sensor;
- a further surface arranged opposite said rolling surface;
- a first active optical component which is a light emitter;
- a second active optical component which is a light detector for detecting light emitted by said light emitter;
- a third active optical component which is a light emitter or is a light detector;
- a sensor axis;
- wherein a region within which said ball can move inside the sensor is limited by at least said rolling surface and said further surface,
- wherein said active optical components are on a first substrate and are arranged outside said region for emitting light through said further surface into said region and detecting light exiting said region through said further surface, respectively, the first substrate being arranged to extend in a direction perpendicular to the sensor axis,
- wherein a shortest distance between the rolling surface and the first substrate differs for different points along the rolling surface, and
- wherein the shortest distance between the rolling surface and the first substrate for the different points coincides with or is parallel to the sensor axis.

19. The sensor of claim 18, wherein the rolling surface has a concave shape.

* * * * *